US012571562B2

(12) United States Patent (10) Patent No.: US 12,571,562 B2

Clelland (45) Date of Patent: Mar. 10, 2026

(54) SOLAR COLLECTOR

(71) Applicant: IMPROVED ENERGY LTD, London (GB)

(72) Inventor: John Clelland, London (GB)

(73) Assignee: IMPROVED ENERGY LTD, London (GB)

( * ) Notice: Subject to any disclaimer, the term of this patent is extended or adjusted under 35 U.S.C. 154(b) by 0 days.

(21) Appl. No.: 18/852,096

(22) PCT Filed: Mar. 29, 2023

(86) PCT No.: PCT/GB2023/050817

§ 371 (c)(1),
(2) Date: Sep. 27, 2024

(87) PCT Pub. No.: WO2023/187373

PCT Pub. Date: Oct. 5, 2023

(65) Prior Publication Data

US 2025/0027684 A1 Jan. 23, 2025

(30) Foreign Application Priority Data

Mar. 29, 2022 (GB) ...................................... 2204447

(51) Int. Cl.
*F24S 10/70* (2018.01)
*F03G 6/06* (2006.01)
(Continued)

(52) U.S. Cl.
CPC .............. *F24S 10/74* (2018.05); *F03G 6/061* (2021.08); *F04D 29/043* (2013.01); *F24S 20/20* (2018.05); *F24S 23/74* (2018.05); *F24S*

*30/425* (2018.05); *F24S 60/30* (2018.05); *F24S 80/52* (2018.05); *F24S 80/54* (2018.05); *F16D 1/02* (2013.01); *F22B 1/006* (2013.01); *F24S 2030/15* (2018.05); *F24S 40/20* (2018.05); *F24S 2080/503* (2018.05)

(58) Field of Classification Search
CPC .......... F24S 10/74; F24S 30/425; F24S 60/30; F24S 23/74; F24S 20/20; F24S 80/52; F24S 2080/503; F24S 40/20; F24S 2030/15; F16D 1/02; F04D 29/043; F22B 1/006

See application file for complete search history.

(56) References Cited

U.S. PATENT DOCUMENTS 4,178,913 A 12/1979 Hutchison
4,394,814 A 7/1983 Wardman et al.
(Continued)

FOREIGN PATENT DOCUMENTS

CA 2129600 A1 2/1996
CN 1216817 A * 5/1999 .............. F24S 10/45
(Continued)

OTHER PUBLICATIONS

English Translation CN 1216817 A (Year: 1999).*
(Continued)

*Primary Examiner* — Shafiq Mian
(74) *Attorney, Agent, or Firm* — Dority & Manning, P.A.

(57) ABSTRACT

A solar collector that comprises a conduit for a working fluid, and a parabolic trough reflector arranged to focus reflected sunlight onto the conduit. The parabolic trough reflector is arranged to pivot around the conduit.

13 Claims, 29 Drawing Sheets

(51) Int. Cl.

| | | |
|---|---|---|
| *F04D 29/043* | (2006.01) |
| *F24S 20/20* | (2018.01) |
| *F24S 23/74* | (2018.01) |
| *F24S 30/425* | (2018.01) |
| *F24S 60/30* | (2018.01) |
| *F24S 80/52* | (2018.01) |
| *F24S 80/54* | (2018.01) |
| *F16D 1/02* | (2006.01) |
| *F22B 1/00* | (2006.01) |
| *F24S 30/00* | (2018.01) |
| *F24S 40/20* | (2018.01) |
| *F24S 80/50* | (2018.01) |

(56) References Cited

U.S. PATENT DOCUMENTS

| | | | |
|---|---|---|---|
| 2004/0231329 A1 | 11/2004 | Carroll et al. | |
| 2011/0067692 A1 | 3/2011 | Dopp et al. | |
| 2011/0073104 A1* | 3/2011 | Dopp | F24S 10/45 |
| | | | 126/684 |
| 2011/0280713 A1 | 11/2011 | Baker | |
| 2013/0056000 A1 | 3/2013 | Perrin | |
| 2016/0298612 A1 | 10/2016 | Bohl et al. | |

FOREIGN PATENT DOCUMENTS

| | | | |
|---|---|---|---|
| CN | 2399676 | Y | 10/2000 |
| CN | 101451514 | A | 6/2009 |
| CN | 101871439 | A | 10/2010 |
| CN | 202597006 | U | 12/2012 |
| CN | 111472951 | A | 7/2020 |
| DE | 2756585 | A1 | 6/1979 |
| EP | 2342810 | B1 | 7/2011 |
| FR | 2460400 | A1 | 1/1981 |
| JP | 2010203624 | A | 9/2010 |
| WO | WO 2012/076949 | A1 | 6/2012 |
| WO | WO2013168074 | A1 | 11/2013 |
| WO | WO2014149261 | A1 | 9/2014 |
| WO | WO 2015/088809 | A1 | 6/2015 |
| WO | WO2015103559 | A1 | 7/2015 |

OTHER PUBLICATIONS

International Search Report for corresponding Application No. PCT/GB2023/050817, dated Jul. 27, 2023, 4 pages.
GB Search Report for corresponding Application No. GB2204447.3, dated May 15, 2023, 4 pages.
GB Search Report for corresponding Application No. GB2204447.3, dated Aug. 19, 2022, 8 pages.
International Preliminary Report on Patentability for corresponding Application No. PCT/GB2023/050817, dated Sep. 24, 2024, 14 pages.

* cited by examiner

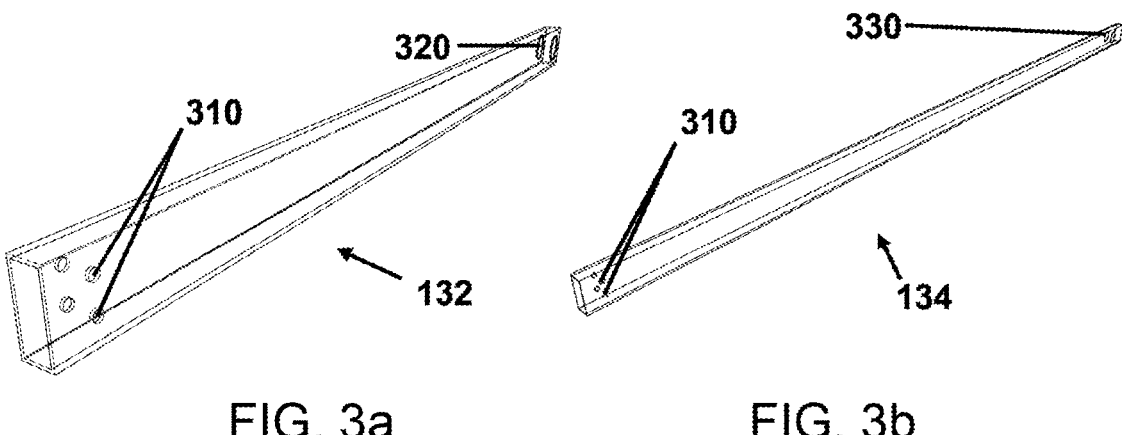
FIG. 3a          FIG. 3b
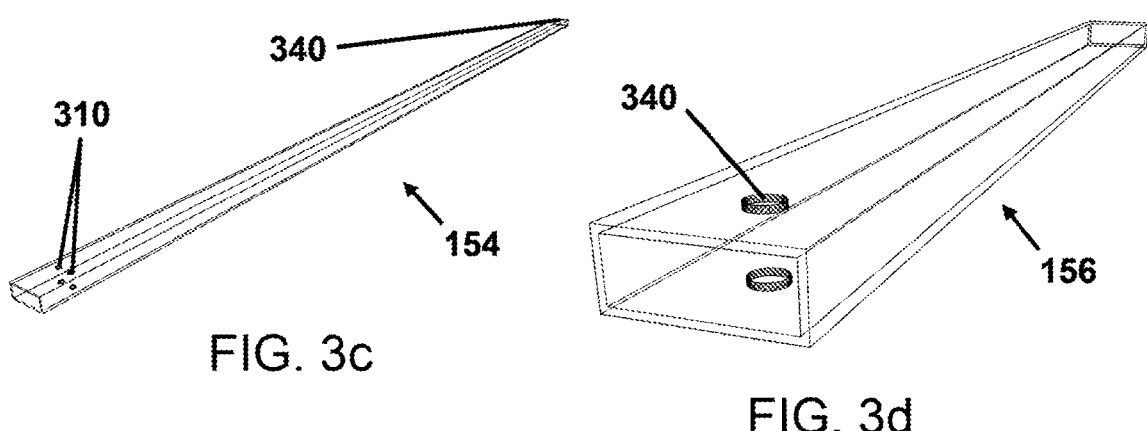
FIG. 3c
FIG. 3d
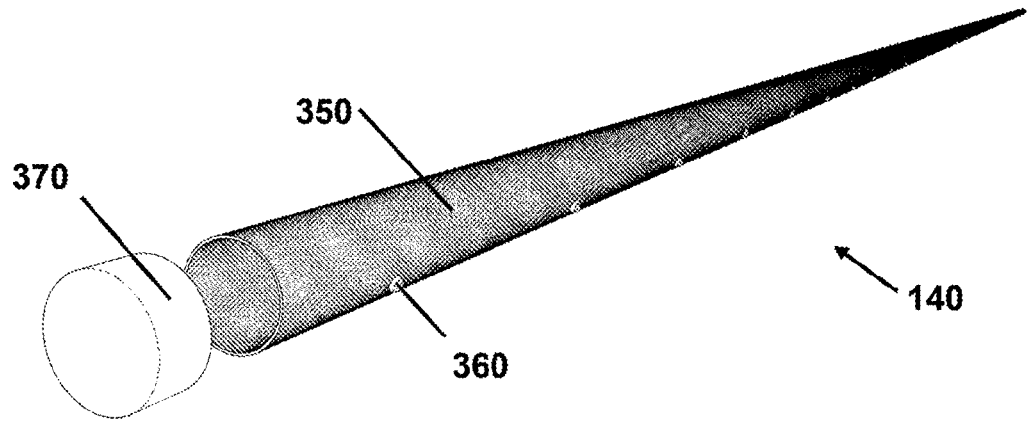
FIG. 3e

760

750

720

718

835, 865

835, 865

SOLAR COLLECTOR

CROSS-REFERENCE TO RELATED APPLICATIONS

This application is the U.S. National Stage entry of International Application No. PCT/GB2023/050817, filed on Mar. 29, 2023, which, in turn, claims priority to GB Patent Application No. 2204447.3, filed on Mar. 29, 2022, both of which are hereby incorporated herein by reference in their entireties for all purposes.

FIELD OF THE INVENTION

The present invention relates to concentrating solar collectors, and in particular the present invention relates to concentrating solar collectors comprising parabolic troughs.

BACKGROUND

Conventional parabolic trough solar collectors typically use parabolic-cylinder-shaped mirror assemblies to focus reflected sunlight onto central focus lines, where material to be heated, such as a conduit for working fluid is arranged.

Existing rotating parabolic trough solar collectors typically comprise parabolic trough reflectors that rotate about axis behind their parabolic reflectors, thereby displacing the focal lines of such reflectors, and requiring conduits onto which they focus reflected light to be displaced and rotated as the troughs are rotated. This requires expensive and complicated connections to these conduits to account for their displacement, and can exert excess strain on the displaced conduits.

An aim of the present invention is to provide improved parabolic trough solar collectors and systems comprising such collectors.

SUMMARY OF THE INVENTION

According to a first aspect of the present invention, there is provided a solar collector comprising: a conduit for a working fluid, and a parabolic trough reflector arranged to focus reflected sunlight onto the conduit; wherein the parabolic trough reflector is arranged to pivot around the conduit. In such solar collectors, the conduits may not be displaced or rotated as the reflectors are rotated to track the movement of the sun, preventing excess strain being applied to the conduits and allowing connections to the conduit to be simple and cheap as they are not required to account for such displacement or rotation.

The conduit may comprise an inner absorber tube for carrying the working fluid, and an outer transparent insulating tube surrounding the inner absorber tube. The inner absorber tube and outer evacuated transparent tube may not be joined to each other. The fact that the inner absorber tube and outer transparent insulating tube are not joined to each other means that, when the inner absorber tube is heated, its axial expansion is not limited or constrained by the outer insulating tube. Therefore, the inner absorber tube can be heated to much higher temperatures than in conventional conduits.

The outer insulating tube may comprise an inner wall, an outer wall, and an at least partially evacuated space between the inner and outer walls. This may enable the outer insulating tube to provide significant thermal insulation via a vacuum without requiring it to be joined to the inner absorber tube.

The inner and outer walls of the outer tube may have substantially the same thermal expansion rates. In particular, the inner and outer walls of the outer tube may be made from materials having substantially the same coefficient of linear thermal expansion. This may allow the solar absorber tube to thermally expand relatively freely in use, without requiring complicated connectors between its inner and outer walls to account for different thermal expansion rates.

The inner absorber tube and outer insulating transparent tube may not be rigidly connected to each other.

The space between the inner and outer walls of the outer tube may be substantially evacuated.

The inner and outer walls of the outer tube may be formed of glass; these walls may be joined or fused to each other at their ends, which may seal the space between them. This may ensure the outer tube in its entirety has a consistent coefficient of linear thermal expansion.

The conduit may comprise a spacer ring, preferably a thermally insulating spacer ring, at each of its ends between the inner absorber tube and the outer insulating tube. This may provide additional thermal insulation to the solar absorber tube, by limiting heat loss through ends of the outer insulating tube.

The length of the outer insulating tube may be substantially equal to the length of the parabolic trough reflector. This may allow a single outer insulating tube to be used for a single solar collector, efficiently insulating the conduit thereof.

Alternatively, the outer insulating tube may comprise a plurality of lengths. Such lengths may or may not be fixed to each other and/or rigidly interconnected to each other end-to-end. Ends of lengths of the outer insulating tube may be arranged within stands and/or bearings through which the conduit and the outer insulating tube extend.

The inner tube may comprise a plurality of lengths which are connected end-to-end, for example, using male and female interconnecting ends.

The outer tube may be a single unitary body with a length equal to the combined length to the plurality of interconnected lengths of the inner tube.

Flexible and/or bellowed pipes for carrying working fluid may be connected to one or both ends of the inner absorber tube of the conduit. Such pipes may allow the inner absorber tube to be heated to very high temperatures in use, as its thermal expansion will not interfere with connections for working fluid at ends connected in this manner.

In some embodiments, a solar collector may further comprise one or more counterweights fixed or rigidly connected to the parabolic trough reflector such that they are located on an opposite side of the conduit to the parabolic trough reflector and/or such that they are rotatable with the parabolic trough reflector around the conduit. This may shift the centre of mass of portions of the solar collector that rotate around the conduit in use towards their axis of rotation about the conduit, reducing the force necessary to rotate them or hold them in an orientation.

The counterweights may be arranged such that the centre of mass of an assembly consisting of the parabolic trough reflector and any other elements rigidly connected thereto that are rotatable around the conduit with the parabolic trough reflector, has a centre of mass adjacent or within the location of the conduit. This may significantly reduce the force necessary to rotate the parabolic trough reflector.

In some embodiments, a solar collector may further comprise one or more bearings, preferably between the conduit and the parabolic trough reflector which may allow the parabolic trough reflector to pivot around the conduit.

Such bearings may minimise mechanical loads imparted on the conduit as the parabolic trough reflector rotates around it.

Each bearing may be an annular bearing comprising a central aperture through which the conduit extends and/or within which the conduit is supported.

The conduit may extend through and/or be supported within central apertures of such annular bearings without being fixed or rigidly connected to the bearings. This means that the conduit is free to move axially with respect to the bearings.

Each bearing may have an inner portion with the central aperture, and the inner portion does not rotate around the conduit upon rotation of the parabolic trough reflector. This means that, in the case where the inner portion contacts the conduit, the rotation of the parabolic trough reflector does not impart a twisting force on the conduit.

In some embodiments, a solar collector may comprise one or more stands. Each stand may support the conduit and may be connected to the parabolic trough reflector by at least one of one or more bearings, such as bearings as described above.

Each stand may comprise an aperture through which the conduit extends and within which the conduit is supported. The conduit may not be fixed or rigidly connected to the stand.

The aperture may be aligned with an aperture of one or more of the bearings, which may be secured to the stand.

Each stand may be fixed to and/or may support one or more of the bearings and/or first raceways thereof, such as an inner raceway.

Such bearings and/or second raceways (such as outer raceways) thereof may be fixed to and/or may support the parabolic trough reflector.

In some embodiments, a solar collector may comprise a cleaning means arranged to spray water onto the parabolic trough reflector. The cleaning means may be rigidly connected to the parabolic trough reflector such that it is rotatable with the parabolic trough reflector around the conduit. This may allow water to be sprayed onto the parabolic trough reflector in conjunction with tilting the parabolic trough reflector by pivoting the swing array, advantageously ensuring that the water runs over the entire surface of the parabolic trough reflector, and/or that the water and any dust or debris dislodged by the water runs off the parabolic trough reflector.

The cleaning means may be located on an opposite side of the conduit to the parabolic trough reflector to which it is rigidly connected.

The cleaning means may comprise a pipe with one or more lateral spray nozzles which may extend along the length of the parabolic trough reflector. This may ensure that the weight of the swing assembly does not need to be increased to maintain balance around conduit (for example, as provided by the counterweights).

The pipe may be connected to and/or may support one or more counterweights.

The water may be de-ionised water.

In some embodiments, the parabolic trough reflector may comprise one or more mirror assemblies that comprise a parabolic-cylinder-shaped reflector surface, a plurality of parabolic stringers arranged on a convex side of the reflector surface, and/or a backing material on the convex side of the reflector surface between the plurality of parabolic stringers. Such a structure may provide a strong lightweight reflector that does not require expensive or complicated supports or tracking motors.

The backing material may be sprayed onto the convex side of the reflector surface.

The backing material may be a foam, for example a closed-cell foam such as a two-part closed-cell polyurethane foam.

According to another embodiment, there is provided a solar collector system comprising a plurality of solar collectors as described above. The plurality of solar collectors may be arranged parallel and laterally offset with respect to each other, and the parabolic trough reflectors of the solar collectors may be interconnected by one or more rigid fixed length linkages such that they pivot together. This may enable a single actuator to rotate the multiple interconnected solar collectors together.

Each rigid fixed length linkage may be connected to each of the parabolic trough reflectors it interconnects by a rotational collar, for example by a rotational collar on a pipe comprised by cleaning means and/or a pipe supporting a plurality of counterweights.

The plurality of solar collectors may be arranged as two or more parallel, laterally offset rows of one or more solar collectors, wherein the parabolic trough reflectors of one row may be interconnected to the parabolic trough reflectors of one or more other rows, for example the immediately adjacent row or rows.

In some embodiments, a solar collector system may further comprise a linear actuator connected to the parabolic trough reflector of a first solar collector of the plurality of solar collectors. The linear actuator may be arranged to rotate the parabolic trough reflectors around the conduit.

The linear actuator may be a hydraulic ram.

According to another embodiment, there is provided a solar collector system comprising one or more solar collectors as described above and a heat exchanger and a storage tank, wherein the storage tank, the heat exchanger and the conduits of each of the one or more solar collectors are connected to define a closed-loop fluid pathway for a working fluid. This may enable thermal energy collected by the solar collectors to be extracted, for example by heating water to generate.

The system may be a system comprising a plurality of solar collectors with interconnected parabolic trough reflectors as described above.

The working fluid may be a Molten Corrosive Heat Transfer Fluid. Such working fluids may have high thermal conductivity, high thermal stability, and low viscosity, such that they form efficient working fluids.

The system may comprise a means for heating the working fluid within the closed loop fluid pathway, such as a blast furnace. Such a means may prevent a working fluid with a high melting point, such as a Molten Corrosive Heat Transfer Fluid from freezing within the closed loop fluid pathway.

The storage tank may comprise an inlet and an outlet.

The storage tank may have one or more impellers for driving the working fluid along the closed loop fluid pathway, which may each be driven by a respective motor located outside the storage tank. This may protect the motors from potentially corrosive working fluids, such as Molten Corrosive Heat Transfer Fluids, thereby extending their lifetime.

The storage tank may be a storage tank as described below with reference to the fourth aspect of the invention.

According to another embodiment, there is provided a solar collector system comprising one or more solar collectors as described above or a solar collector system as described above, a heat exchanger and one or more piston tanks. Each piston tank may comprise a first portion for receiving steam from the heat exchanger, and a second portion for containing water, wherein the first and second portions are separated by a displaceable barrier, such that steam entering the first portion increases the hydrostatic pressure within the second portion. Such piston tanks may drive out water from their second portions under hydrostatic pressure when steam is received by their first portions, for example for use in generating electricity using a water turbine.

The system may be a system comprising a plurality of solar collectors with interconnected parabolic trough reflectors as described above, and/or a system comprising a storage tank as described above.

The first and second portions may be upper and lower portions respectively and the displaceable barrier may be a floating barrier that floats upon the water within the lower portion of the piston tank. The water containing lower portion being located below the steam containing upper portion may allow the barrier not to be air-tight and water-tight, as the separation between the portions is defined by the water-level within the tank. The barrier thermally insulates the steam from the water, which may prevent it from being excessively cooled thereby.

The displaceable and/or floating barrier may be an insulating barrier.

Each piston tank may comprise a means for spraying cold water into its first portion. Spraying water into the first portion may cause steam therein to contract creating a vacuum effect and displacing the displaceable barrier.

The second portion of each tank may comprise an outlet and an inlet for water, which may each comprise a respective one-way valve.

In some embodiments, the solar collector system may comprise a water turbine configured to be driven by water being driven out of the one or more piston tanks under increased hydrostatic pressure.

Alternatively, or additionally, the solar collector system may comprise a water desalination and/or purification system configured to receive the water driven out of the one or more piston tanks under the increased hydrostatic pressure.

In some embodiments, a solar collector system as described above may comprise two or more piston tanks.

In some embodiments, the system may comprise a valve arrangement configured to direct steam from the heat exchanger alternately into the first portion of a first of the piston tanks and into the first portion of a second of the piston tanks. The valve arrangement may be further configured to direct and/or spray cold water into the first portion of the second of the piston tanks while directing steam into the first portion of the first of the piston tanks, and to direct and/or spray cold water into the first portion of the first of the piston tanks while directing steam into the first portion of the second of the piston tanks. This may enable pressurised water to be continuously provided by one of the two or more piston tanks.

According to a second aspect of the present invention, there is provided a conduit for a solar collector, the conduit comprising an inner absorber tube for carrying the working fluid, and an outer transparent insulating tube surrounding the inner absorber tube, wherein the inner absorber tube and outer transparent insulating tube are not joined to each other. The fact that the inner absorber tube and outer transparent insulating tube are not joined to each other means that, when the inner absorber tube is heated, its axial expansion is not limited or constrained by the outer insulating tube. Therefore, the inner absorber tube can be heated to much higher temperatures than in conventional conduits.

In some embodiments, the outer insulating tube comprises an inner wall, an outer wall, and an at least partially evacuated space between the inner and outer walls. This may enable the outer insulating tube to provide significant thermal insulation via a vacuum without requiring it to be joined to the inner absorber tube.

In some embodiments, the inner and outer walls of the outer tube have substantially the same thermal expansion rates.

In particular, the inner and outer walls of the outer tube may be made from materials having substantially the same coefficient of linear thermal expansion. This may allow the solar absorber tube to thermally expand relatively freely in use, without requiring complicated connectors between its inner and outer walls to account for different thermal expansion rates.

The space between the inner and outer walls of the outer tube may be substantially evacuated.

In some embodiments, the inner and outer walls of the outer tube are formed of glass.

The glass walls may be joined or fused to each other at their ends, which may seal the space between them. This may ensure the outer tube in its entirety has a consistent coefficient of linear thermal expansion.

The conduit may comprise a spacer ring, preferably a thermally insulating spacer ring, at each of its ends between the inner absorber tube and the outer insulating tube. This may provide additional thermal insulation to the solar absorber tube, by limiting heat loss through ends of the outer insulating tube.

The inner tube may comprise a plurality of lengths which are connected end-to-end, for example, using male and female interconnecting ends.

The outer tube may be a single unitary body with a length equal to the combined length to the plurality of interconnected lengths of the inner tube.

Flexible and/or bellowed pipes for carrying working fluid may be connected to one or both ends of the inner absorber tube of the conduit.

According to another embodiment, there is provided a solar collector comprising a conduit as described above.

According to another embodiment, there is provided a method of operating a solar collector with a conduit for a working fluid, and a parabolic trough reflector arranged to focus reflected sunlight onto the conduit; the method comprising pivoting the parabolic trough reflector around the conduit. The solar collector may comprise any of the optional features described above. This may allow the solar reflector to track the movement of the sun without displacing or rotating the conduit onto which it reflects light, preventing excess strain being applied to the conduit and allowing connections to the conduit to be simple and cheap as they are not required to account for any such displacement or rotation.

According to a third aspect of the present invention, there is provided a solar collector system comprising one or more solar collectors arranged to heat a working fluid, a heat exchanger arranged to use heat from the working fluid to generate steam, and one or more piston tanks, each comprising a first portion for receiving steam from the heat exchanger, and a second portion for containing water, wherein the first and second portions are separated by a displaceable barrier, such that steam entering the first portion increases the hydrostatic pressure within the second portion. The one or more solar collectors may comprise any of the optional features described above.

According to a fourth aspect of the invention there is provided an assembly comprising a storage tank, an impeller located inside the storage tank, a corresponding motor located outside the storage tank, a shaft extending from the impeller out of the storage tank towards the motor by which the motor is configured to rotate the impeller, and a thermal break provided between the shaft and the motor. The assembly may be a fluid circulation assembly or a fluid agitation assembly. The fluid agitation assembly may be configured to agitate the fluid to store heat. A plurality of such impellers, motors, shafts and thermal breaks may be provided.

The storage tank may be a storage tank for a high temperature fluid, such as a high temperature working fluid for use with solar collector system (such as a system as described above) or other energy system. In some embodiments, the working fluid may be a molten salt, such as a Molten Corrosive Heat Transfer Fluid (MCHTF). In use, the storage tank may be at least partially filled with such a fluid, the remainder of the tank may be filled with an inert gas. The tank may be a thermocline storage tank comprising a region of relatively cold fluid and a region of relatively hot fluid, separated by a portion of fluid with a temperature gradient (or thermocline). The tank may be thermally insulated to minimise heat loss from the fluid to the tank's exterior.

In some embodiments the assembly comprises a plurality of impellers located inside the storage tank, a plurality of corresponding motors located outside the storage tank, a plurality of shafts, each connecting one of the impellers to a corresponding one of the motors such that that motor is configured to rotate that impeller, wherein a thermal break is provided between the interior of the storage tank and each of the motors.

The one or more motors being located outside the storage tank may extend their lifetimes by separating them from high temperature and/or corrosive fluids within the storage tanks, such as molten corrosive heat transfer fluids.

The storage tank may comprise one or more inlets and/or one or more outlets. Such inlets and/or outlets may be provided by openings through a wall of the storage tank, and/or by ends of conduits that extend into the interior of the storage tank. Each of the one or more impellers may be located within or adjacent to one of the inlets and/or outlets, such as within a housing (such as a cylindrical or funnel shaped housing) at or defining an inlet and/or outlet. Such impellers may be configured to drive fluid into or out of said inlet and/or outlet. Alternatively, or additionally one or more impellers may be provided elsewhere within the storage tank, for example to circulate and/or agitate a fluid within the storage tank.

The storage tank may comprise openings through its walls through which the one or more shafts and/or conduits to inlets and/or outlets extend. In some examples, such apertures may be through flanges covering larger apertures, which may be opened, for example to allow impellers to be inserted and/or removed from the interior of the storage tank.

Each of the one or more thermal breaks may be provided between a corresponding shaft and a corresponding motor. Each thermal break may be provided by a ceramic material and or other material with a higher thermal insulation than the shaft. In some examples, the thermal break is provided by a tube or other body interconnecting a shaft of the motor with the shaft extending from the impeller out of the storage tank towards the motor.

The storage tank may comprise additional components, for example a heat exchanger may be provided within the storage tank through which an additional fluid (such as water) may be passed to transfer heat thereto from the contents of the storage tank. Such a heat exchanger may be defined by or may comprise a coiled conduit within the storage tank.

Preferred features of the first aspect are equally applicable to the second, third or fourth aspects. Preferred features of the second aspect are equally applicable to the third and fourth aspects. Preferred features of the third aspect are equally applicable to the fourth aspect. The fourth aspect and its preferred features are equally applicable to the first, second or third aspects.

Arrangements of the embodiments will be understood and appreciated from the following detailed description, made by way of example and taken in conjunction with the drawings.

BRIEF DESCRIPTION OF THE FIGURES

FIG. 1b shows a detailed view of a swing assembly of the solar collector module of FIG. 1a;

FIG. 1c shows a detailed view of a stand element of the solar collector module of FIG. 1a;

FIG. 1d shows an exploded view of a bearing mechanism connected to a stand at an end of the solar collector module of FIG. 1a;

FIG. 1e shows an exploded view of two bearing mechanisms connected to a stand part way along the solar collector module of FIG. 1a;

FIG. 2a shows a detailed view of an outer race of a bearing mechanism of the solar collector module of FIG. 1a;

FIG. 2b shows a detailed view of an annular coupling of a stand of the solar collector module of FIG. 1a;

FIG. 2c shows a detailed view of an inner retainer of a bearing mechanism of the solar collector module of FIG. 1a FIG. 2d shows a detailed view of a spacer of a bearing mechanism of the solar collector module of FIG. 1a;

FIG. 2e shows a detailed view of a cover plate of a bearing mechanism of the solar collector module of FIG. 1a;

FIG. 2f shows a detailed view of mirror supporting tube of the swing assembly of the solar collector module of FIG. 1a;

FIG. 3a shows a detailed view of an upper arm of a swing assembly of the solar collector module of FIG. 1a;

FIG. 3b shows a detailed view of a lower arm of a swing assembly of the solar collector module of FIG. 1a;

FIG. 3c shows a detailed view of a leg of a stand of the solar collector module of FIG. 1a;

FIG. 3d shows a detailed view of an anchor of a stand of the solar collector module of FIG. 1a;

FIG. 3e shows a detailed view of the upper tube of the solar collector module of FIG. 1a;

FIG. 4a shows a detailed view of lengths of an inner absorber tube of conduit of the solar collector module of FIG. 1a;

FIG. 4b shows a detailed view of glass evacuated insulator tube of the conduit of the solar collector module of FIG. 1a;

FIG. 4c shows an exploded view of an end of the evacuated insulator tube of FIG. 4b;

FIG. 4d shows a detailed view of an end of the evacuated insulator tube of FIG. 4b;

FIG. 5a shows a detailed view of the construction of a mirror assembly of the parabolic trough reflector of the solar collector module of FIG. 1a;

DETAILED DESCRIPTION

Referring to the figures generally, there are shown examples of solar collectors comprising parabolic trough reflectors arranged to pivot around conduits for working fluids onto which they focus reflected light, and solar collection systems comprising such solar collectors.

As described above, existing rotating parabolic trough solar collectors typically comprise parabolic trough reflectors that rotate about an axis behind their parabolic reflectors, thereby displacing the focal lines of such reflectors, and requiring conduits onto which they focus reflected light to be displaced and rotated as the troughs are rotated. This requires expensive and complicated connections to these conduits to account for their displacement, and can exert excess strain on the displaced conduits.

Embodiments of solar collectors described herein comprise one or more parabolic trough reflectors that pivot around conduits onto which they focus reflected light. In such solar collectors, the conduits are not displaced or rotated as the reflectors are rotated to track the movement of the sun. The conduits may be mechanically disconnected from the rotating parabolic trough reflectors.

Figures 6A, 6B:
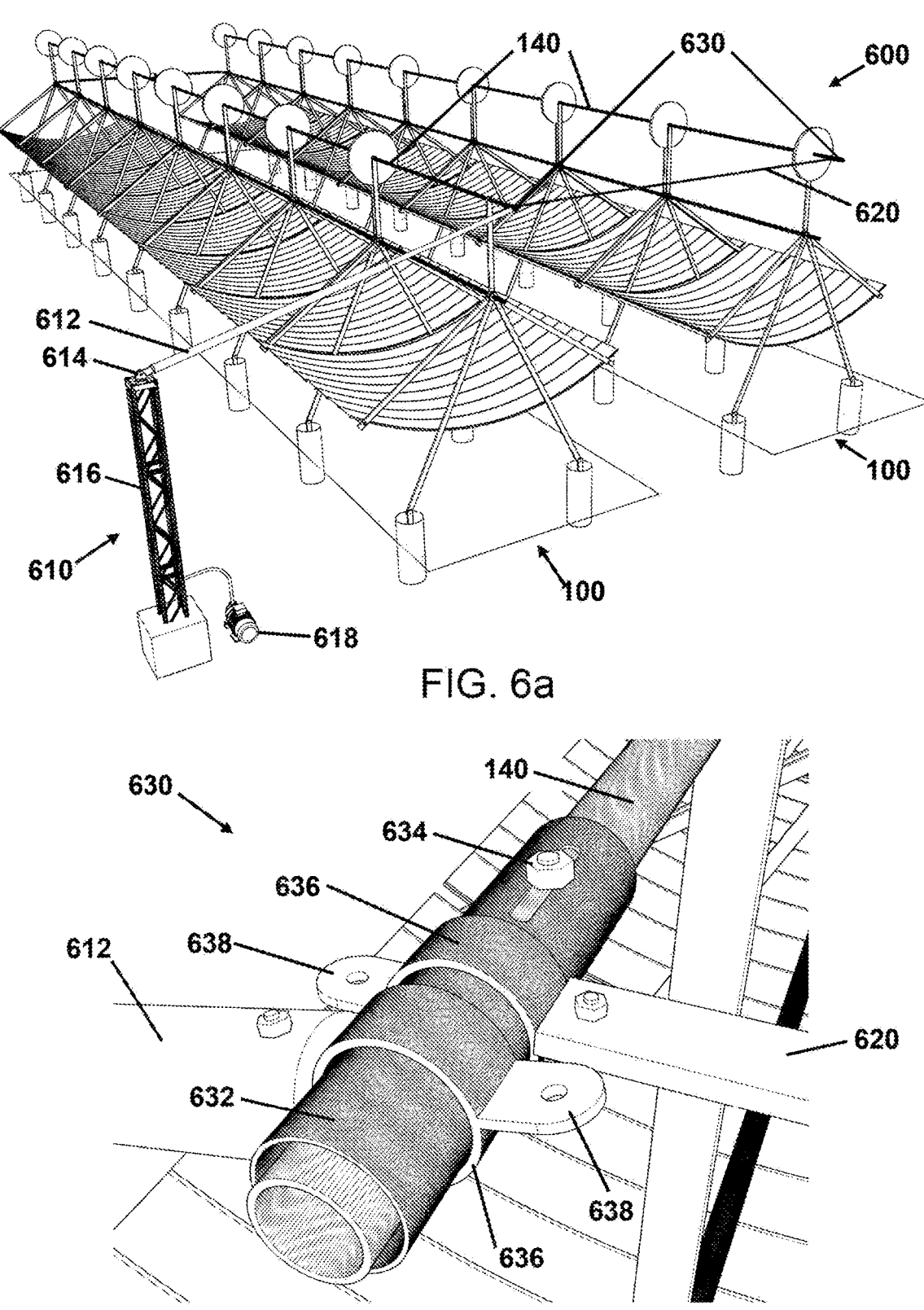
FIG. 6*a* shows a solar collector assembly comprising a plurality of solar collector modules as shown in FIG. 1*a;*
FIG. 6*b* shows a detailed view of the rotational collars of the solar collector assembly of FIG. 6*a;*

In some embodiments, a parabolic trough reflector 120 that rotates around a conduit 110 may be part of an assembly, such as a swing assembly, that rotates around the conduit 110 in its entirety. Such an assembly may comprise a plurality of components fixed and/or rigidly connected to the parabolic trough reflector 120, such as counterweights 130, cleaning means 140, and/or interconnecting or supporting elements, 132, 134. One or more components of such an assembly, such as the cleaning means 140 may be connected to an external actuator for rotating the swing assembly (such as the extendable arm 612 of a hydraulic ram assembly 610 as shown in FIG. 6*a*, or another linear actuator), for example via a rotational collar assembly 630 as described below with reference to FIG. 6*b.*

Figure 1A:
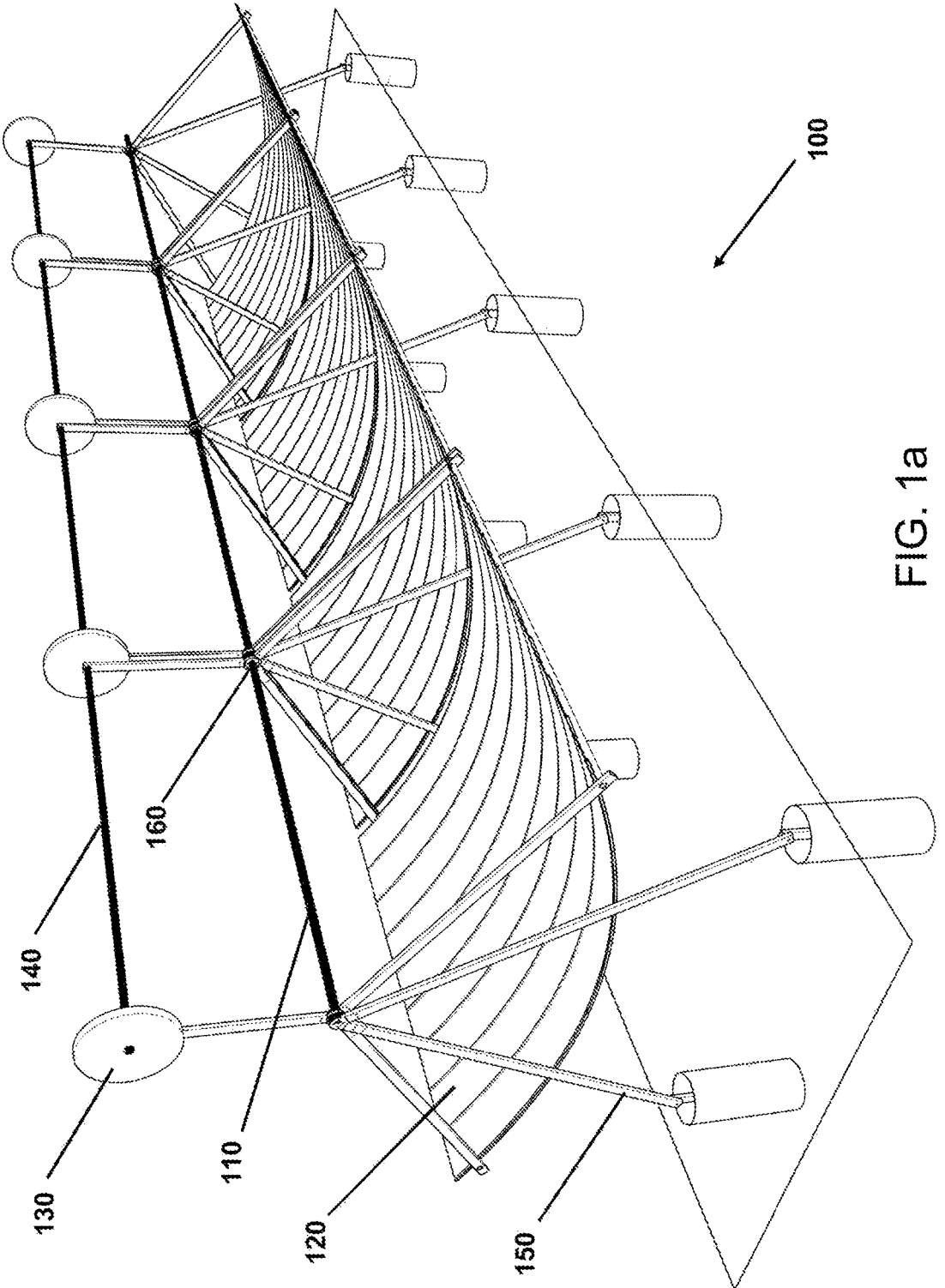
FIG. 1a shows an embodiment of a solar collector module.

FIG. 1*a* shows an example of a solar collector module 100 comprising a solar parabolic trough reflector 120 arranged to focus reflected light onto a conduit 110 for a working fluid about which it rotates. The solar collector module comprises the conduit 110; a swing assembly including the parabolic trough reflector 120 that is arranged to pivot around the conduit 110, a plurality of stands 150 arranged to support the receiver conduit 110 and the pivoting swing assembly and a plurality of bearing mechanisms 160 arranged to connect the swing assembly to the stands 150.

In some embodiments, the solar collector module 100 may comprise one or more counterweights 130, which may be fixed and/or rigidly connected to the parabolic trough reflector 120 such that they rotate with it around the conduit 110. The counterweights 130 may be located on an opposite side of the conduit 110 to the parabolic trough reflector 120, such that they shift centre of mass of the rotating assembly towards its axis of rotation on the conduit 110. In some such embodiments, the one or more counterweights 130 may be arranged such that the centre of mass of an assembly consisting of the parabolic trough reflector 120 and any other elements fixed and/or rigidly connected thereto that rotate around the conduit 110 with the parabolic trough reflector 120, has a centre of mass adjacent or within the location of the conduit 110.

Figure 1B:
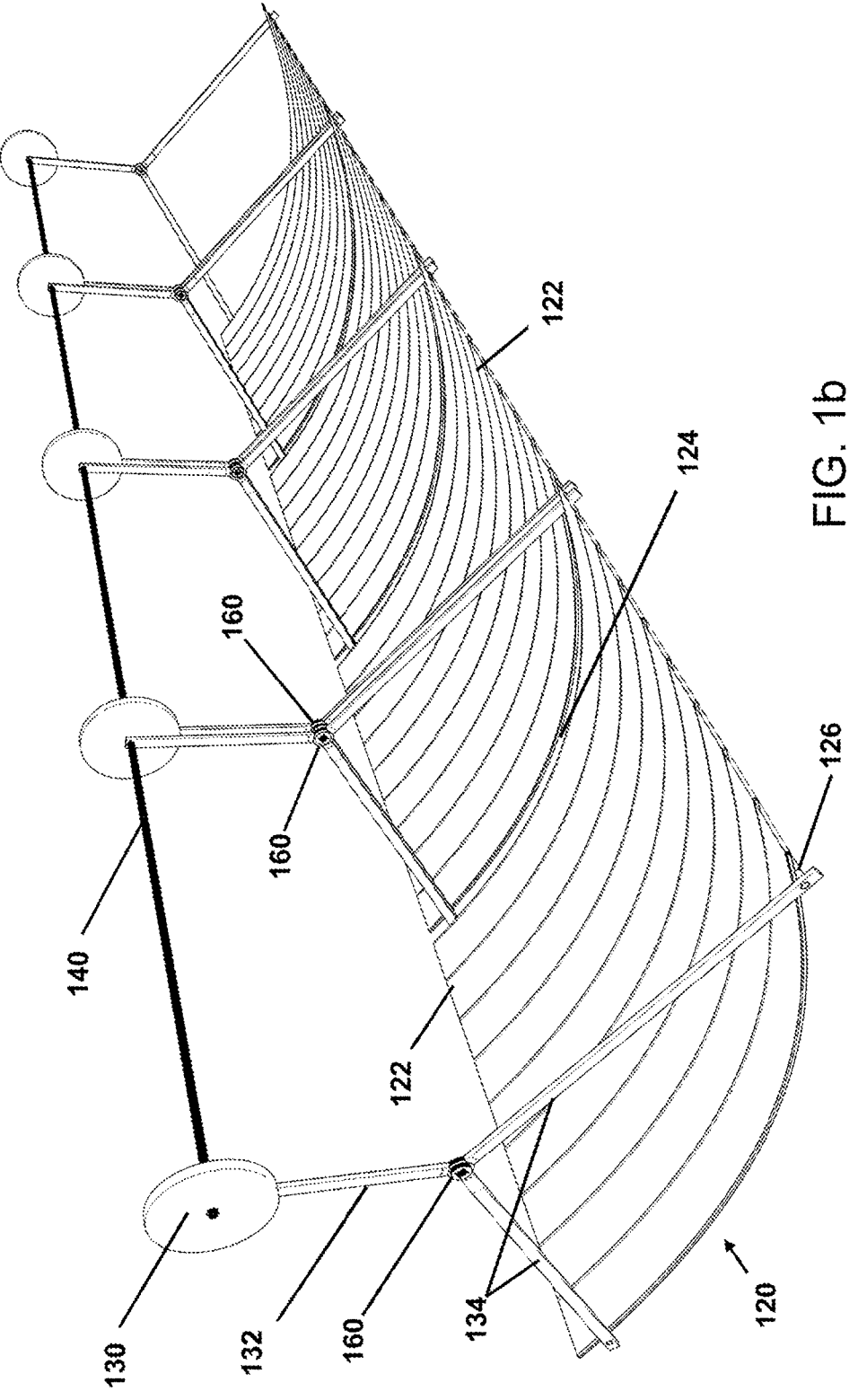

FIG. 1*b* shows the swing assembly of the solar collector module 100 of FIG. 1*a* in isolation. The swing assembly comprises a parabolic trough reflector 120 arranged to focus reflected light onto the conduit 110 about which it rotates; a plurality of counterweights 130 arranged such that the centre of mass of the swing assembly is on or close to the receiver conduit 110 about which it rotates; an upper tube 140 extending through the counterweights; and a plurality of interconnecting arms 132, 134.

In this embodiment, the parabolic trough reflector 120 consists of a series of parabolic-cylinder-shaped mirror assemblies 122 arranged with narrow gaps 124 between them for a stand 150 to fit within. The mirror assemblies 122 are interconnected to each other by the upper tube 140 such that they all rotate together around the conduit 110.

Each mirror assembly 122 is supported by a pair of supporting tubes 126, which extend between ends of lower arms 134 near corners of the mirror assembly 122. Two lower arms 134 extend from each curved mirror assembly 122 to single a bearing assembly 160 for rotationally connecting the swing assembly to a stand 150. For each pair of lower arms 134 supporting a mirror assembly 122 that extend to a single bearing mechanism 160, a third upper arm 132 extends from the bearing mechanism 160 directly away from the parabolic mirror assembly 122. These upper arms 132 support the counterweights 130 and the upper tube 140 at a distance from the mirror assemblies 122 of the parabolic trough reflector 120 such that the centre of mass of the swing assembly is on or close to an axis through the bearing mechanisms where the conduit 110 is located in use, and onto which the parabolic mirror assemblies 122 focus reflected light. At this distance, the counterweights 130 and upper tube 140 are sufficiently distant from the parabolic mirror assemblies 122 such that they cast minimal shading thereon.

In some embodiments, solar collector modules 100 may comprise one or more bearings separating the conduit 110 from the parabolic reflector 120, such as annular bearings 160 surrounding the conduit 110. The conduit 110 may extend through and/or be supported within central apertures 230 of such annular bearings 160, but may do so without being fixed and/or rigidly connected to the bearings 160, so as to minimise mechanical loads imparted on the conduit 110 as the parabolic trough reflector 120 rotates around it.

Embodiments of solar collectors may comprise one or more stands 150, which may each support their conduit 110, and may each be connected to the parabolic trough reflector 120 via a bearing 160 as described above. Such stands 150 may comprise apertures through which the conduit 110 extends and within which the conduit 110 is supported. Bearings 160 as described above may be secured to such stands 150, for example adjacent apertures 230 thereof, such that apertures 230 of the stand and the bearing are aligned. Such stands 150 may be fixed to and/or may support one or more bearings 160 and/or first raceways thereof, such as inner raceways 164 thereof. Such bearings 160 may be fixed to and/or may support the parabolic trough reflector 120. For example, second raceways of the bearings 160, such as outer raceways 166 thereof, may be fixed to the parabolic trough reflector 120 and/or a swing assembly comprising the parabolic trough reflector 120.

Figure 1C:
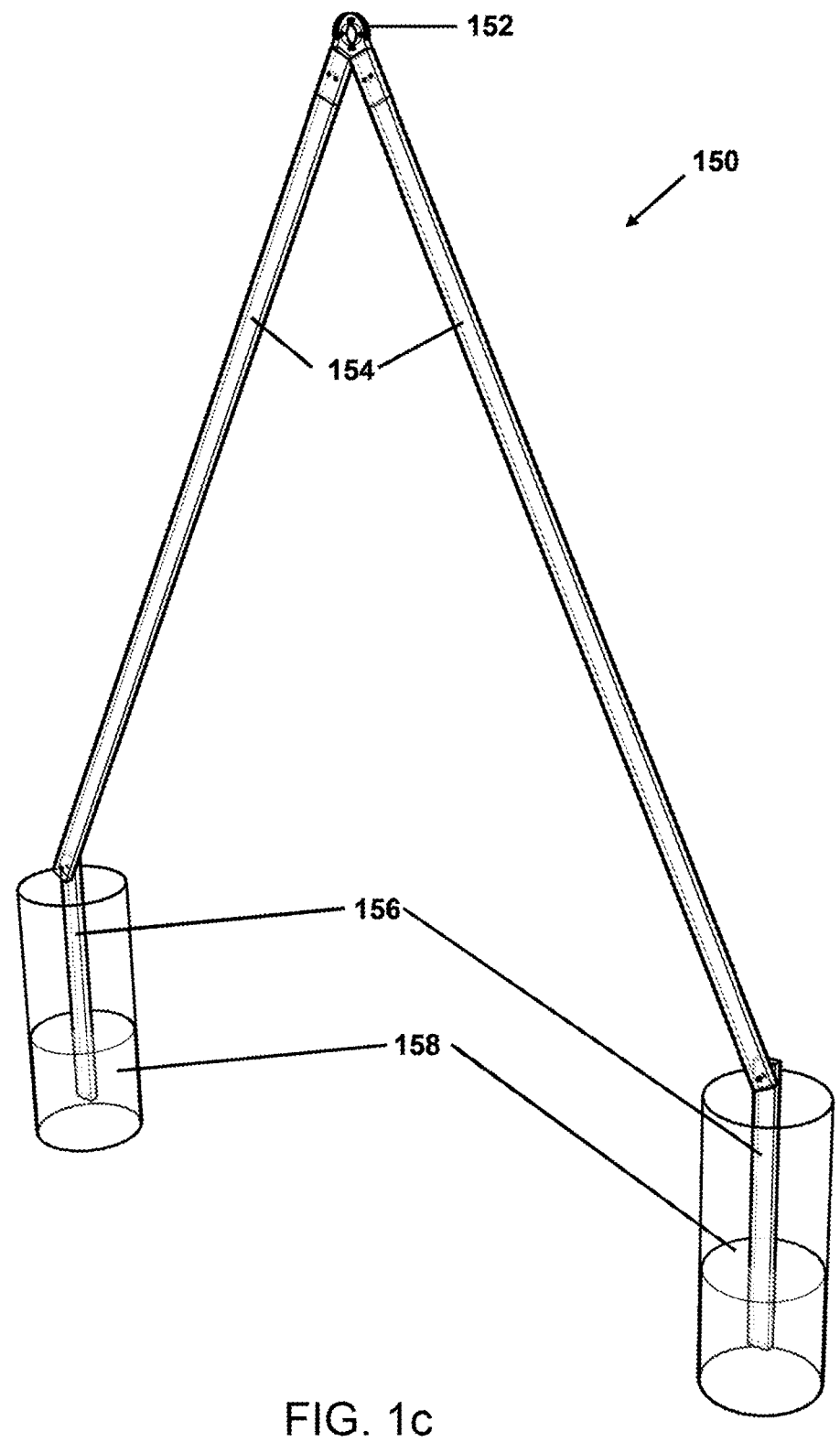

FIG. 1*c* shows a single stand 150 of the solar collector module 100 of FIG. 1*a* in isolation. The stand comprises an annular coupling 152, a pair of legs 154 extending from the annular coupling 152 in an inverted V-shape, two anchors 156 each connected to the base of one of the two legs 154, and concrete basing 158 within which the anchors 156 are embedded. In the illustrated example, the concrete basing 158 is shown as two separate elements. However, it will be appreciated that multiple anchors 156 may be embedded within a single large concrete base which may extend beneath the solar collector module 100. The annular coupling 152 defines a hole 230 through which the conduit 110 extends such that it is supported by the stand 150.

A bearing mechanism 160 connects the annular coupling 152 to the interconnecting support struts of the swing assembly, such that the swing assembly is able to rotate relative to the stand 150 about the conduit 110.

Figure 1D:
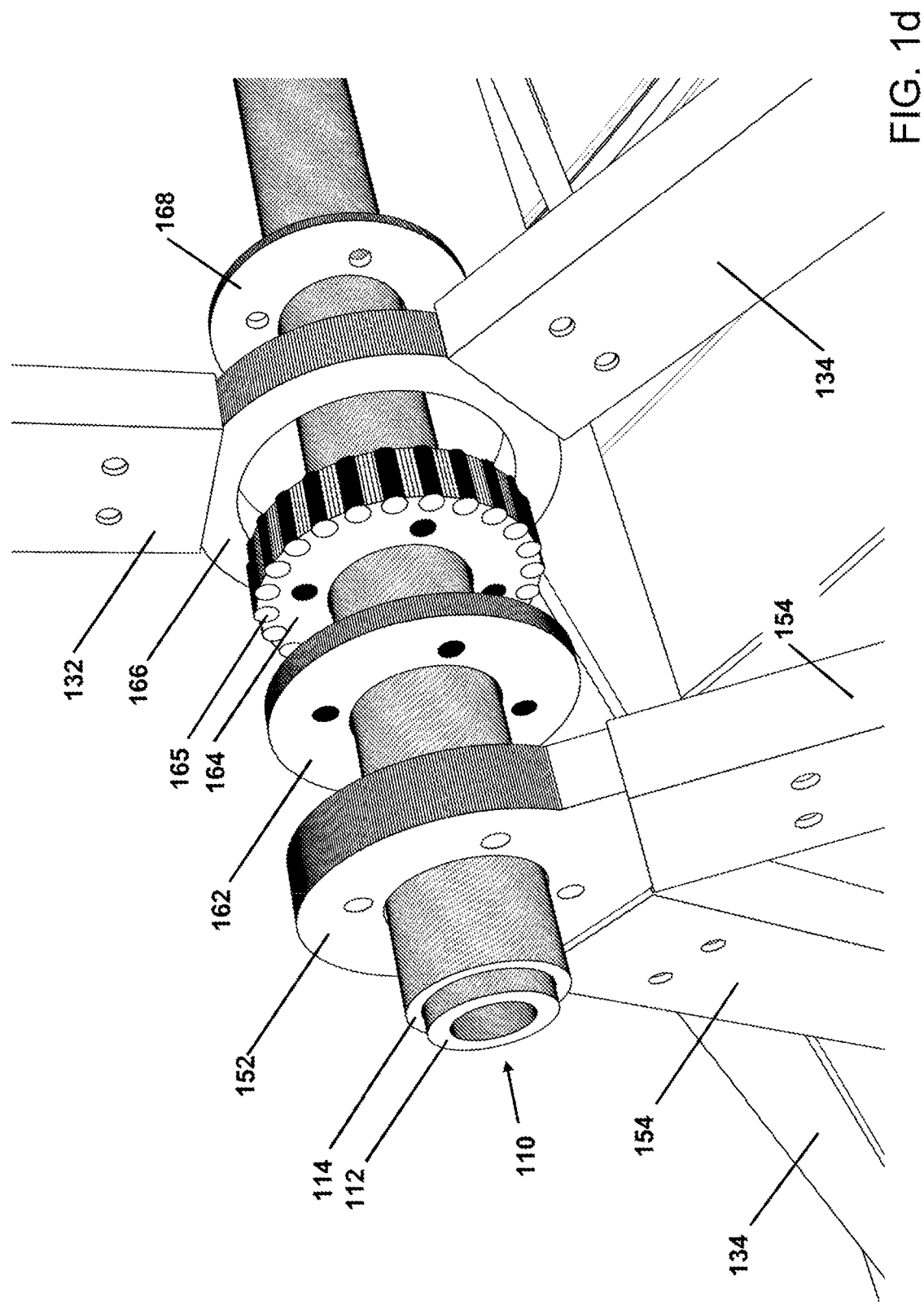
Figure 1E:
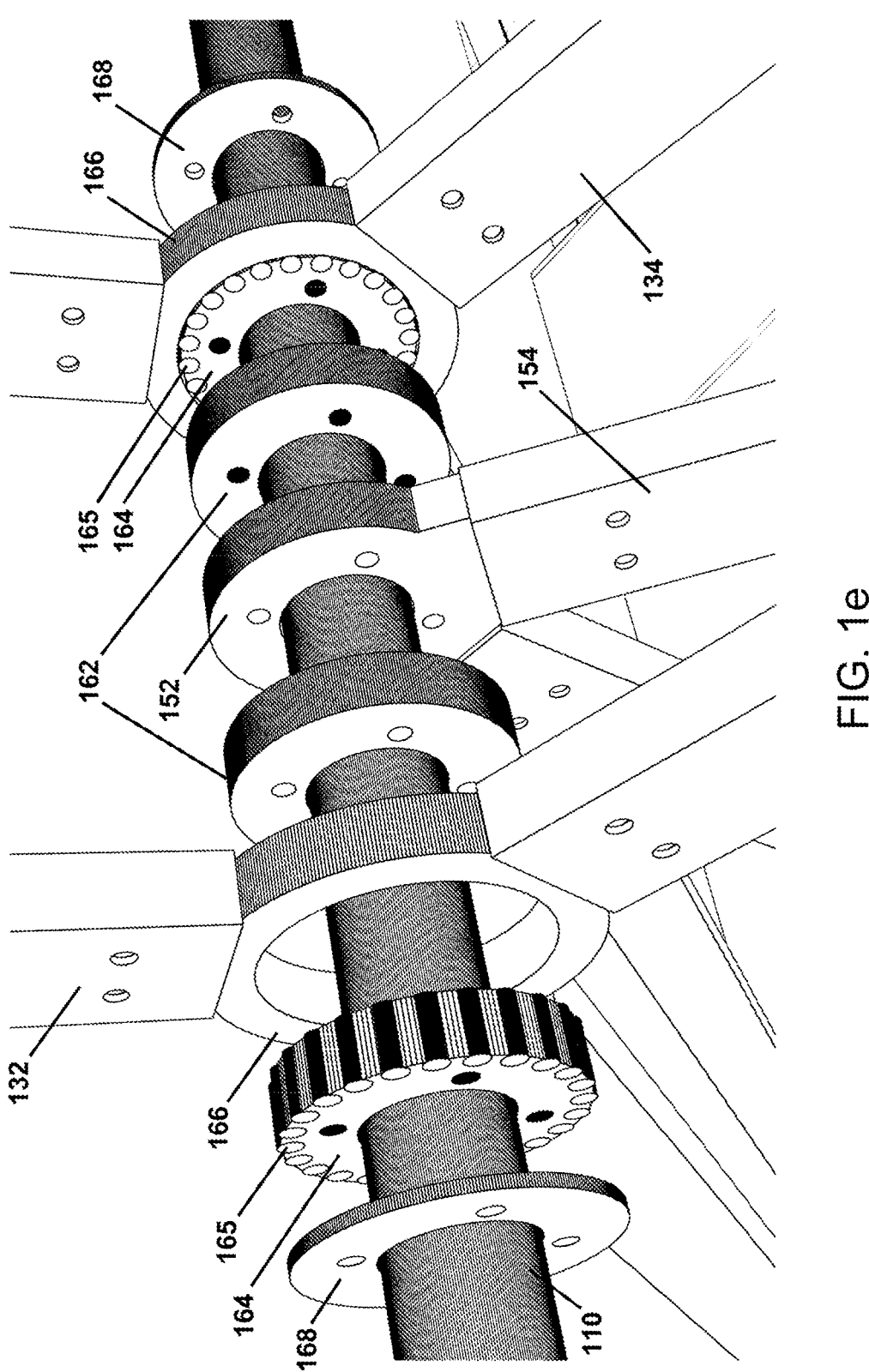

FIGS. 1*d* and 1*e* show exploded views of one of the bearing mechanisms 160 in detail. FIG. 1*d* shows an exploded view of the annular coupling 152 of a stand 150 at an end of the solar collector module 100 connected to a single bearing mechanism 160 at the end of the swing assembly. FIG. 1*e* shows an exploded view of the annular coupling 152 of a stand 150, part way along the solar collector between a pair of mirror assemblies 122 connected to two bearing mechanisms, each of which connect to separate trios of arms 132, 134 and separate mirror assemblies 122 of the swing assembly.

The bearing mechanism 160 each comprise a spacer 162, an inner retainer 164, a plurality of needle bearing rollers 165, an outer race 166 and a cover plate 168. The spacer 162, inner retainer 164, and the cover plate 168 of each bearing are fixed side-by-side to a side of an annular coupling 152 of a stand 150. The plurality of needle bearing rollers 165 of each bearing mechanism 160 are retained within inner retainer 164 of that bearing assembly, between the spacer 162 and the cover plate 168.

The outer race 166 surrounds the inner retainer 164 and the bearing rollers 165 and is free to rotate around the inner retainer 164. The outer raceway 166 is connected to three arms 132, 134 of the swing assembly (two of which extend to an edge of a mirror assembly 122, and one of which extends to a counterweight 130 and the upper tube 140), and enables these arms 132, 134, and the swing assembly in its entirety to rotate relative to the remainder of the bearing mechanism 160, the stands 150 and the conduit 110.

The spacer 162 of the bearing mechanism provides a separation between the stand 150 to which it is connected and the arms 132, 134 of the swing assembly to which the outer race 166 of its bearing assembly is connected.

In some embodiments, the conduit 110 of a solar collector module 100 may comprise an inner absorber tube 112 for carrying the working fluid, and an outer evacuated transparent tube 114 surrounding the inner absorber tube, which may minimise heat loss from the inner tube 112 by conduction or convection. The outer evacuated transparent tube 114 may comprise transparent inner and outer walls and an at least partially evacuated gap between the inner and outer walls.

The inner absorber tube 112, and the outer evacuated tube 114 may not be fixed and/or rigidly connected. This may enable the inner and outer tubes 112, 114 to expand by different amounts as they are heated by reflected sunlight in use, without exerting excess strain on either component. In pre-existing solar heating conduits comprising inner and outer tubes manufactured as a single rigidly interconnected unit, differing thermal expansion rates of the inner and outer tubes can limit maximum useable temperatures of the conduits and/or necessitate complicated manufacturing techniques. The conduit 110 and inner and outer tubes 112, 114 are described in more detail below with reference to FIGS. 4*a* to 4*d*.

FIG. 1*d* shows a sectional view of the conduit 110 of the solar collector module 100. The conduit 110 comprises an inner solar absorber tube 112 that carries a working fluid in use, and an outer glass evacuated insulator tube 114 which allows reflected light from the parabolic trough reflector 120 to heat the inner solar absorber tube 112, but which minimises heat loss from the inner solar absorber tube 112 by conduction or convection. The inner solar absorber tube 112 and outer glass evacuated tube 114 of the conduit 110 are not fixed and/or rigidly connected to each other.

FIGS. 2*a* to 2*e* show the outer race 166 of a bearing mechanism 160, the annular coupling 152 of a stand 150; the inner retainer 164 & needle roller bearing 165 of a bearing mechanism 160; a spacer 162 of a bearing mechanism 160; and a cover plate 168 of a bearing mechanism 160 respectively.

The outer race 166 comprises three radially extending inserts 200, which in use are inserted into open ends of the arms 132, 134 of the swing assembly. Each insert 200 comprises a pair of holes 210 for receiving bolts or other fasteners for securing the arms 132, 134 to the insert 200, and by extension to the bearing mechanism 160.

The annular coupling 152 comprises two inserts 200 which in use are inserted into the legs 154 of a stand 150. The inserts 200 of the annular coupling also comprise holes 210 for receiving bolts or other fasteners for securing the legs 154 to the inserts 200, as shown in FIG. 1*c*. The inserts of the annular coupling 152 comprise shoulders against which the legs 154 abut in use.

The annular coupling 152, the inner retainer 164, spacer 162, and the cover plate 168 each comprise a central circular aperture 230 through which the conduit 110 extends in use and a series of holes 240 surrounding this aperture 230 for receiving bolts or other fasteners to connect the spacer 162, inner retainer 164 and cover plate 168 of the bearing mechanism 160 to each other, and to the annular coupling 152 of a stand 150, as shown in FIGS. 1*d* and 1*e*.

The inner retainer 164 additionally comprises a series of bearing channels 250 around its perimeter for holding the needle roller bearings 165. The needle roller bearings 165 are held within these bearing channels between the spacer 162 and cover plate 168 of the bearing mechanism 160, such that they are free to rotate, enabling the outer race 166 to rotate freely around the inner retainer 164.

Figures 2A, 2B, 2C, 2D, 2E, 2F:
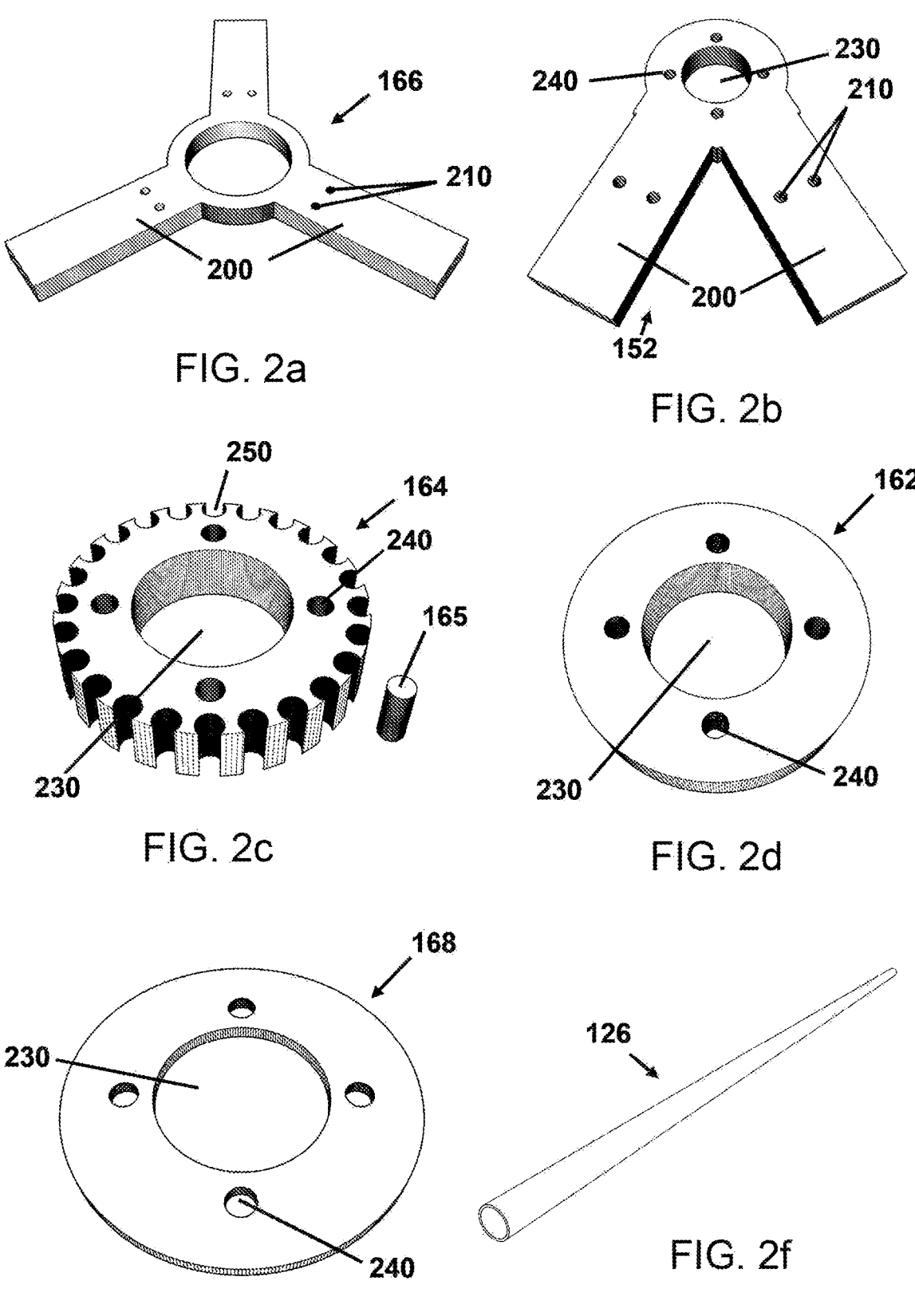

FIG. 2*f* shows a mirror supporting tube 126 of the swing assembly of the solar collector module 100 in detail.

FIGS. 3*a* and 3*b* show upper arms 132 and lower arms 134 of the swing assembly in detail. The arms 132, 134 are elongate metal struts with hollow rectangular cross sections. The arms 132, 134, each comprise two pairs of holes 310 through both sides of the arm 132, 134 adjacent an open end for receiving an insert 200 of an outer race 166 of a bearing mechanism 160. In use, these holes receive bolts or other fasteners that pass through corresponding holes 210 in the insert, in order to secure the insert within the arm 132, 134.

At their opposite ends, the upper arms 132 comprise apertures 320 through their sides for receiving and holding the upper tube 140 extending through that end of the arm, and the lower arms 134 each comprise an aperture 330 for receiving and holding the mirror supporting tubes 126 extending through that end of the arm and using bolts or other fasteners connect to the mirror assembly 122 of the parabolic trough reflector 120.

FIGS. 3*c* and 3*d* show a leg 154 and an anchor 156 of a stand 150 of the solar collector module 100 in detail. The leg 154 and anchor 156 are also elongate metal struts with hollow rectangular cross sections. The leg 154 comprises two pairs of holes 310 through both of its sides adjacent an open end for receiving an insert 200 of an annular coupling 152. In use, these holes receive bolts or other fasteners that pass through corresponding holes 210 in the insert, in order to secure the insert within the leg 154. An opposite end of the leg 154, and an end of the anchor 156 each comprise holes 340 through both of their sides for receiving a bolt or other faster to connect that end of the leg 154 to that end of the anchor 156, as shown in FIG. 1*c*. The end of the anchor 156 that does not comprise the hole 340 is inserted into the concrete basing in use.

In some embodiments, solar collectors may comprise a cleaning means arranged to spray water onto its parabolic trough reflector. Such a cleaning means may be fixed and/or rigidly connected to the parabolic trough reflector such that it rotates with it around the conduit.

This may allow water to be sprayed onto the parabolic trough reflector in conjunction with tilting the parabolic trough reflector by pivoting the swing array. This may advantageously ensure the water runs over the entire surface of the parabolic trough reflector, and/or that the water and any dust or debris dislodged by the water runs off the parabolic trough reflector.

Such a cleaning means may be located on an opposite side of the conduit to the parabolic trough reflector, such that the weight of the swing assembly does not need to be increased to maintain balance around the conduit (for example, as provided by the counterweights). The cleaning assembly may comprise a pipe with a plurality of lateral spray nozzles, which may extend along the length of the parabolic trough reflector. For example, the illustrated solar collector module 100 comprises such a cleaning means in the form of an upper tube 140.

FIG. 3*e* shows a detailed view of the upper tube 140 comprised by the swing assembly of the solar collector module 100. The upper tube 140 extends along the length of the solar collector through the holes 320 at ends of the upper arms 132 of the swing assembly and through centres of the counterweights 130. The upper tube 140 supports the counterweights 130 such that the centre of mass of the swing assembly is on or close to the centre of the conduit 110 about which it pivots.

The upper tube 140 comprises a hollow tubular body 350 with a plurality of spray nozzles through it along its length. These spray nozzles 360 are directed towards the parabolic trough reflector 120. In use, pressurized de-ionised water may be pumped into the upper tube 140, such that sprays out of the nozzles onto the mirror assemblies 122 of the parabolic trough reflector 120. This can advantageously be used to clean the surfaces of the parabolic trough reflector 120 of dust or debris, increasing its reflectivity and the efficiency of the solar reflector.

The upper tube 140 comprises an end cap 370 at one end to seal that end of its tubular body 350. This advantageously allows water within the upper tube 140 to reach sufficiently high pressures to be sprayed out of the upper tube 140 onto the parabolic reflector trough 120.

In some embodiments the spray nozzles 360 may comprise valves configured to only open when the pressure within the upper tube 140 exceeds a threshold, thereby ensuring the water sprayed out of the tube is at a sufficiently high pressure to effectively clean the parabolic trough reflector.

Additionally, the upper tube 140 provides a rigid connection between the individual mirror assemblies 122 along the entire length of the swing assembly allowing the entire swing assembly to be pivoted together about the conduit 110 by displacing the upper tube 140. The upper tube is located at a distance from swing assembly's axis of rotation, such that the force that needs to be exerted on the upper tube to pivot the swing assembly or to hold it in a pivoted position is low.

In some embodiments, conduits 110 of solar collectors may comprise an inner tube for carrying a working fluid and a transparent outer tube surrounding the inner tube, wherein the outer tube comprises transparent inner and outer walls and an at least partially evacuated gap between the inner and outer walls. In such embodiments, the inner tube may not be fixed and/or rigidly connected to the outer tube. FIGS. 4*a* to 4*d* show detailed views of components 112, 114 of such a conduit 110 as comprised by the solar collector shown in FIG. 1*a*.

Figures 4A, 4B, 4C, 4D:
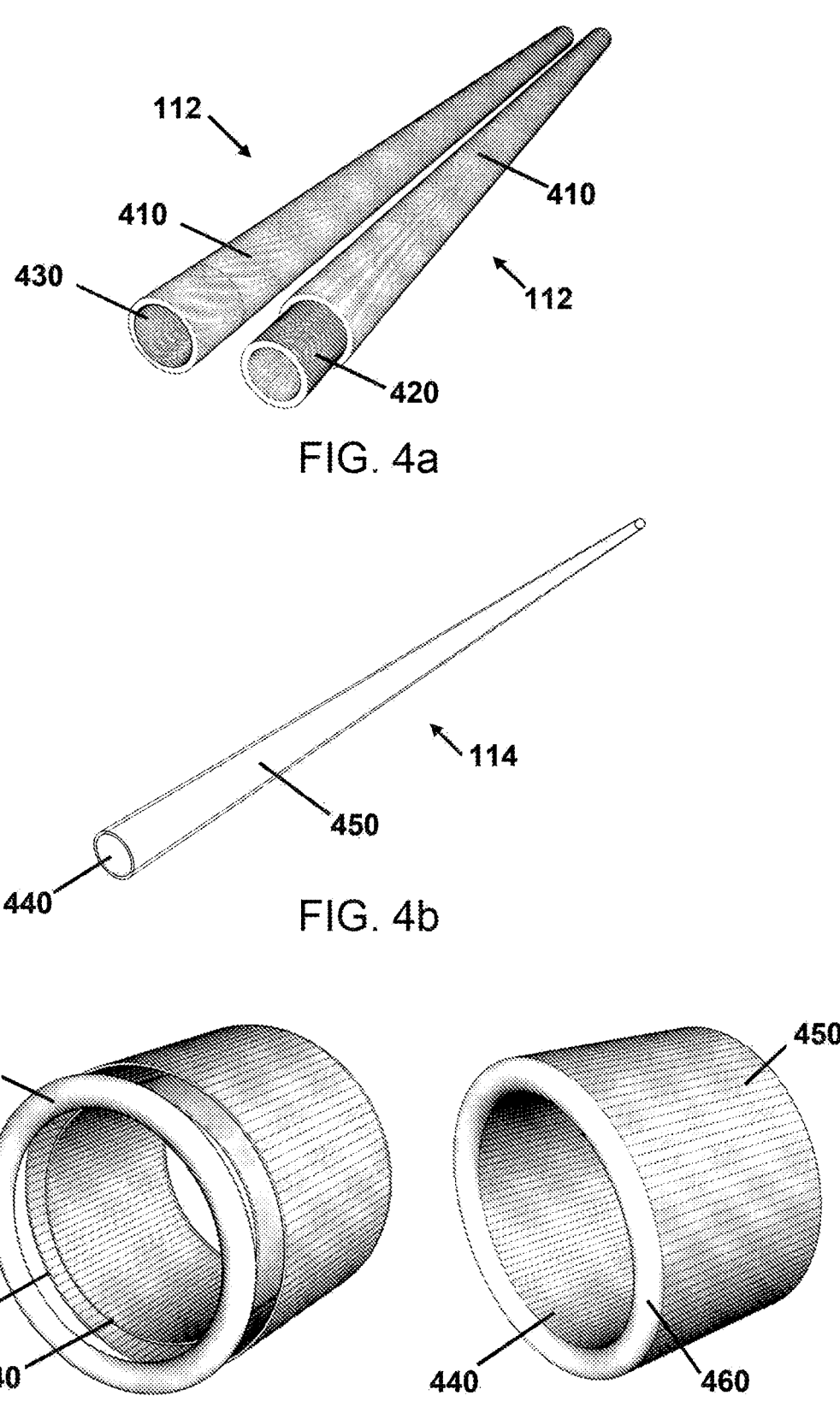

The solar absorber tube 112 comprises a plurality of lengths 410 which are connected end-to-end in use in order to reach a required length. FIG. 4a shows two lengths 410 of the inner solar absorber tube 112. A first male end 420 of each length 410 comprises a portion with a reduced outer diameter and an exterior thread, and a second female end 430 of each length 410 comprises a portion with an increased interior diameter and a matching interior thread. This enables the male ends 420 of lengths 410 to be screwed into the female ends 430 of adjacent lengths 410 to construct the solar absorber tube 112. The inner tube 112 and/or lengths thereof are preferably constructed from a material with low reflectance at wavelengths of sunlight. In some embodiments, the inner tube may be a steel inner tube.

FIG. 4b shows an outer glass evacuated insulator tube 114 of a conduit of the solar collector module 100 in detail. The outer glass evacuated insulator tube 114 consists of first and second transparent cylindrical tubes 440, 450 with thin glass walls. The first tube 440 is arranged within the second outer tube 450, such that the first and second tubes define inner and outer walls of the insulator tube 114 respectively. The inner and outer tubes 440, 450 are of equal length to each other. The inner and outer tubes 440, 450 are melted, fused, or annealed together at each of their ends to create a seal 460 which seals the space between the inner and outer tubes 440, 450. The illustrated seal 460 has a semi-circular cross section. The space between the inner and outer tubes 440, 450 is evacuated of nearly all air molecules to create a vacuum therein. FIGS. 4c and 4d show detailed exploded and assembled views of an end of the insulator tube 114 respectively.

In the illustrated embodiment, the inner and outer tubes 440, 450 are of substantially equal length to the solar collector module 100 and parabolic trough reflector 120 thereof, such that the outer tube 114 consists of a single body. In other embodiments the outer insulating tube 114 may comprise a plurality of lengths, each of which may be constructed in the same manner as the single tube 114 described herein. Such lengths may or may not be fixed to each other and/or rigidly interconnected end-to-end. For example, in the solar collector module shown in FIG. 1a, the outer insulating tube 114 may be made up of four lengths, one for each mirror assembly 122, each length being about 3 metres long. However, the lengths could be made longer or shorter than this. Ends of lengths of the outer insulating tube 114 may be arranged within stands 150 and/or bearings 160 through which the conduit 110 and the outer insulating tube 114 extend.

The inner absorber tube 112 is arranged within the interior of the outer insulator tube 114. The vacuum in the outer tube 114 thermally insulates the inner absorber tube 112 to minimise heat loss by conduction or convection therefrom. A thermally insulating ring is arranged between the inner and outer tubes 112, 114 at each end of the conduit 110 to further insulate the interior of the outer tube 114. These insulating rings preferably are not fixed or rigidly connected to one or both of the inner and outer tubes 112, 114, such that the inner tube is free to slide and/or thermally expand relative to the outer tube 114. The thermally insulating ring may be a ring of flat fire rope, or other sealing and insulating material.

Conventional solar collector working fluid conduits comprise vacuums defined directly between steel inner working-fluid-carrying tubes carrying and surrounding single layer glass outer tubes. This requires sealing the glass outer tubes around steel inner tubes using complicated and expensive steel bellows to account for the different thermal expansion rates of the glass outer and steel inner tubes in use. Additionally, the ends of such conduits require flexible connections to allow for such expansion.

In contrast, in an embodiment of a conduit module 100 as described above with reference to FIGS. 4a to 4d, comprising an inner tube that is not fixed or rigidly connected to its surrounding outer tube, the inner solar absorber tube 112 may expand as it is heated without exerting excessive forces on the surrounding outer tube 114. Therefore, the only limit on the temperature that may be reached by the conduit is the melting temperature of the inner tube 112 itself. The inner tube 112 may arranged to slide freely within the outer tube 114. Connections for working fluid to the ends of the inner tube may be flexible and/or bellowed to allow for movement or expansion of the inner tube in use, without risk of fatigue damaging them.

In some embodiments, the parabolic trough reflector may comprise one or more mirror assemblies that comprise a parabolic-cylinder-shaped reflector surface, a plurality of parabolic stringers arranged on a convex side of the reflector surface, and a backing material on the convex side of the reflector surface intermediate the plurality of parabolic stringers, which may strengthen the surface of the mirror assembly. This structure allows the parabolic reflectors to be significantly thinner than existing concentrated solar power reflectors.

Figure 5A:
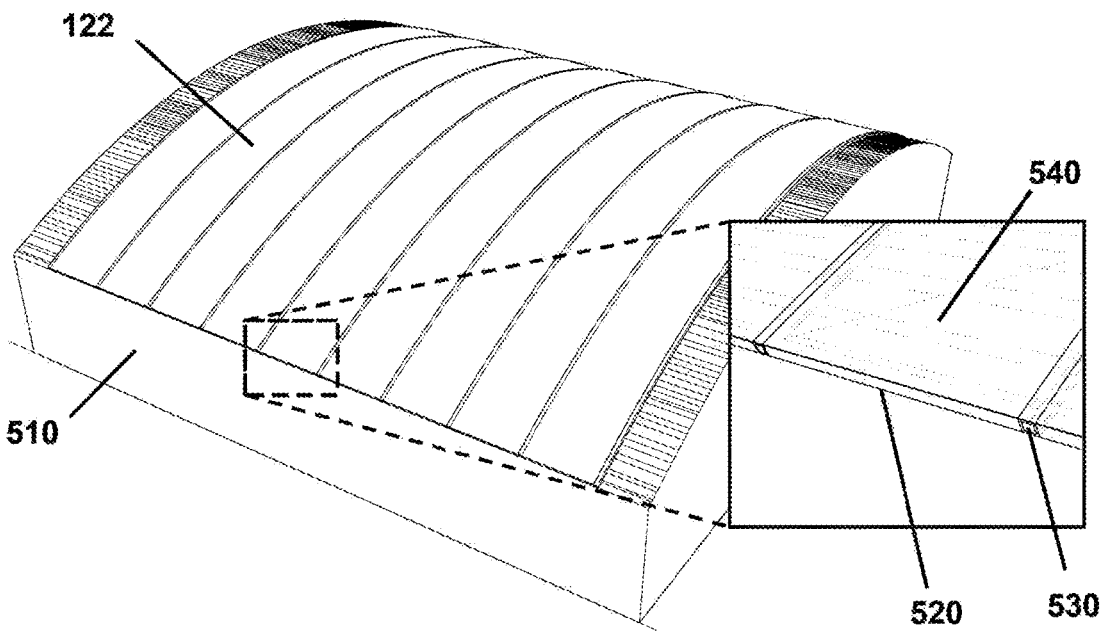

For example, FIG. 5a shows a single mirror assembly 122 of the parabolic trough reflector 120 of the collar collector module 100 of FIG. 1a during its construction using a parabolic former 510. The mirror assembly 122 comprises a concave parabolic cylinder-shaped reflective surface 520, a plurality of parabolic stringers 530 arranged behind and bonded to the reflective surface 520, and a strengthening backing material 540, such as a two-part closed-cell polyurethane foam, sprayed onto the reflective surface 520 with a thickness equal to the thickness of the parabolic stringers 530. FIG. 5a shows a portion of the edge of the mirror assembly 122 in additional detail.

Figure 5B:
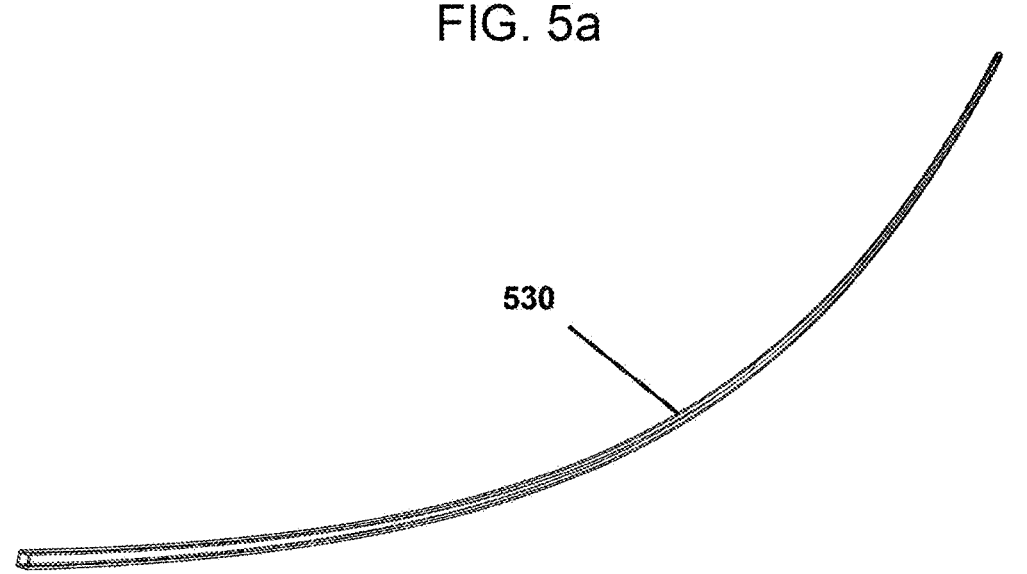
FIG. 5*b* shows a detailed view of a parabolic stringer of the mirror assembly of FIG. 5*a;*

FIG. 5b shows a single parabolic stringer 530 in isolation. The parabolic stringers 530 provide rigidity to the mirror assembly 122, helping it maintain its parabolic shape and allowing it to be securely fastened to a pair of supporting tubes 126 as shown in FIG. 1b.

Conventional pivoting parabolic trough solar collectors use heavy supports to maintain their parabolic shape and to resist wind force on their reflectors, necessitating expensive especially strong tracking motors.

In some embodiments, solar collector assemblies or systems may comprise a plurality of solar collector modules 100 as described above. Such modules may be arranged in parallel, for example, with their conduits and parabolic trough reflectors extending north to south.

In some such embodiments, the parabolic trough reflector of one or more of the solar collectors may be connected to a parabolic trough reflector of an adjacent solar collector by a rigid fixed length linkage such that the connected parabolic trough reflectors pivot together. This may advantageously enable a single actuator, such as a linear actuator, hydraulic ram, or hydraulic cylinder, to rotate multiple of the solar collector modules 100 to the same angle, for example in order to track the motion of the sun, or during a cleaning operation.

FIG. 6a shows an example of a solar collector assembly 600 comprising a plurality of solar collector modules 100 arranged to rotate together. The assembly 600 comprises a plurality of modules 100 as described above with reference to FIGS. 1a to 5b arranged in parallel rows, a hydraulic ram assembly 610 arranged to rotate a first solar collector module row, a linkage 620 between first module row and a second module row such that the rows rotate together, and a plurality of rotational collar assemblies 630 shown in FIG. 6b connecting upper tubes 140 of the solar collector modules 100 to the hydraulic ram assembly 610 and the linkages 620.

In the illustrated assembly 600, each row consists of two solar collector modules 100 as described above connected end-to-end in a line in series such that they rotate together. In other embodiments, each row may consist of any number of one or more solar collector modules connected in such a manner.

The hydraulic ram assembly 610 comprises an extendable arm 612 (in the form of a hydraulic ram or hydraulic cylinder) that is connected to the upper tube 140 of the first solar collector module 100 by a rotational collar. The hydraulic ram assembly 610 is arranged to retract and extend the extendable arm 612 in order to rotate the swing assembly of the first solar collector module 100 by displacing its upper tube 140. The extendable arm 612 has a hinged anchor 614 at its end opposite the end connected to the upper tube, such that it is able to swing as the connected swing assembly pivots.

In the illustrated example, the hydraulic ram assembly 610 comprises the extendable arm 612 serving as the linear actuator, the hinged anchor 614, a vertical truss 616 supporting the hinged anchor 614 and extendable arm 612, and a hydraulic pump 618 configured to extend and retract the extendable arm 612. In other embodiments, the linear actuator may be any other linear actuator, such as an electric motor driven linear actuator.

The upper tube 140 of a first solar collector module 100 in the first row and the upper tube 140 of a second solar collector module 100 in the second row are connected by a linkage 620. The linkage 620 is a rigid connection of substantially equal length to the separation between the conduits 110 of the two solar collector modules 100. The linkage is connected to the upper tubes 140 of the modules 100 using rotational collar assemblies 630.

As the upper tube 140 of the first module 100 is displaced by the extendable arm 612, the rigid fixed length linkage ensures that the upper tube 140 of the second module 100 is displaced in an identical manner. This allows the extendable arm 612 to simultaneously rotate the plurality of solar collector modules 100 to substantially the same angle, for example to track the movement of the sun. The solar collector assembly 600 shown in FIG. 6a advantageously requires only a single extendable arm 612, such as hydraulic ram, to rotate the multiple parabolic trough reflectors, in contrast to existing parabolic trough collectors which must be rotated by separate motors.

Figure 6C:
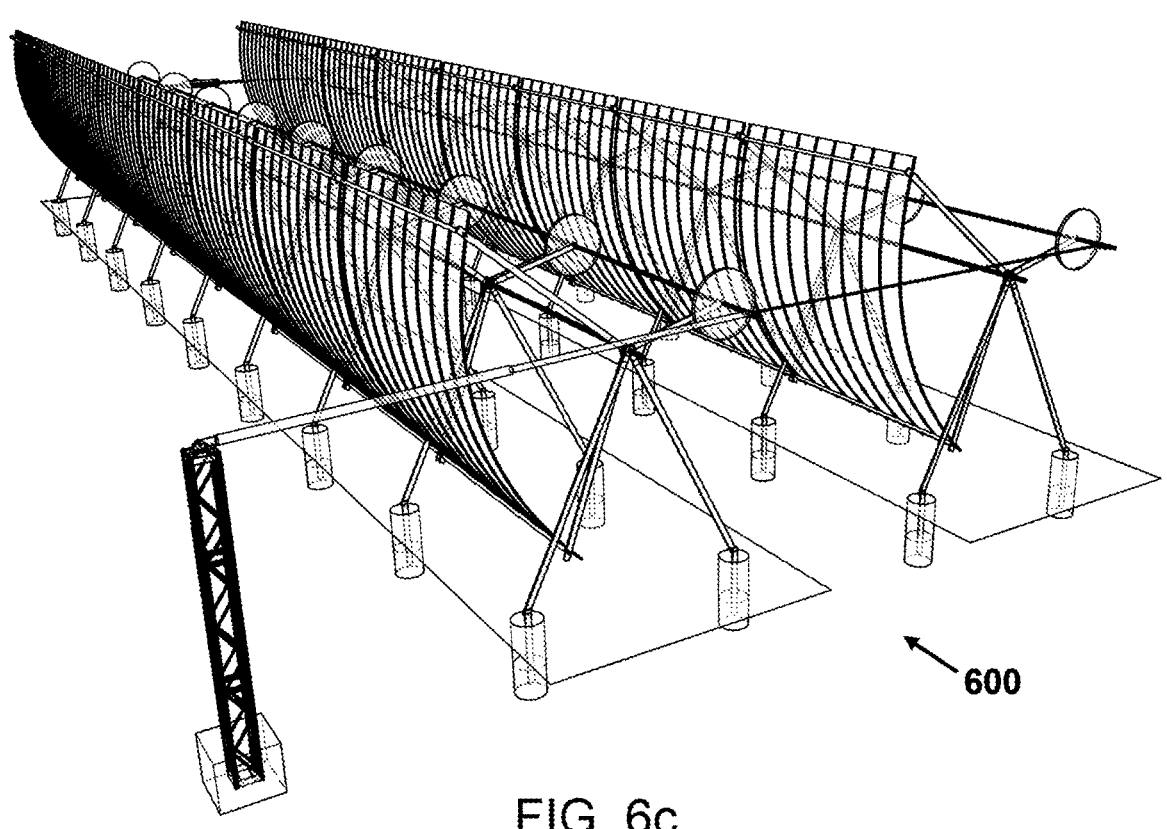
FIG. 6*c* shows the solar collector assembly of FIG. 6*a* in a first configuration.

FIG. 6c shows the solar collecting assembly 600 in a first configuration with the extendable arm 612 fully extended, such that the upper tubes 140 of the modules 100 are displaced away from the hydraulic ram assembly 610, and the parabolic trough reflectors 120 both face away from the hydraulic ram assembly 610. This arrangement may be used at sunrise if the hydraulic ram assembly 610 is arranged to the east of the modules 100, or at sunset if it is arranged to the west of the modules 100.

Figure 6D:
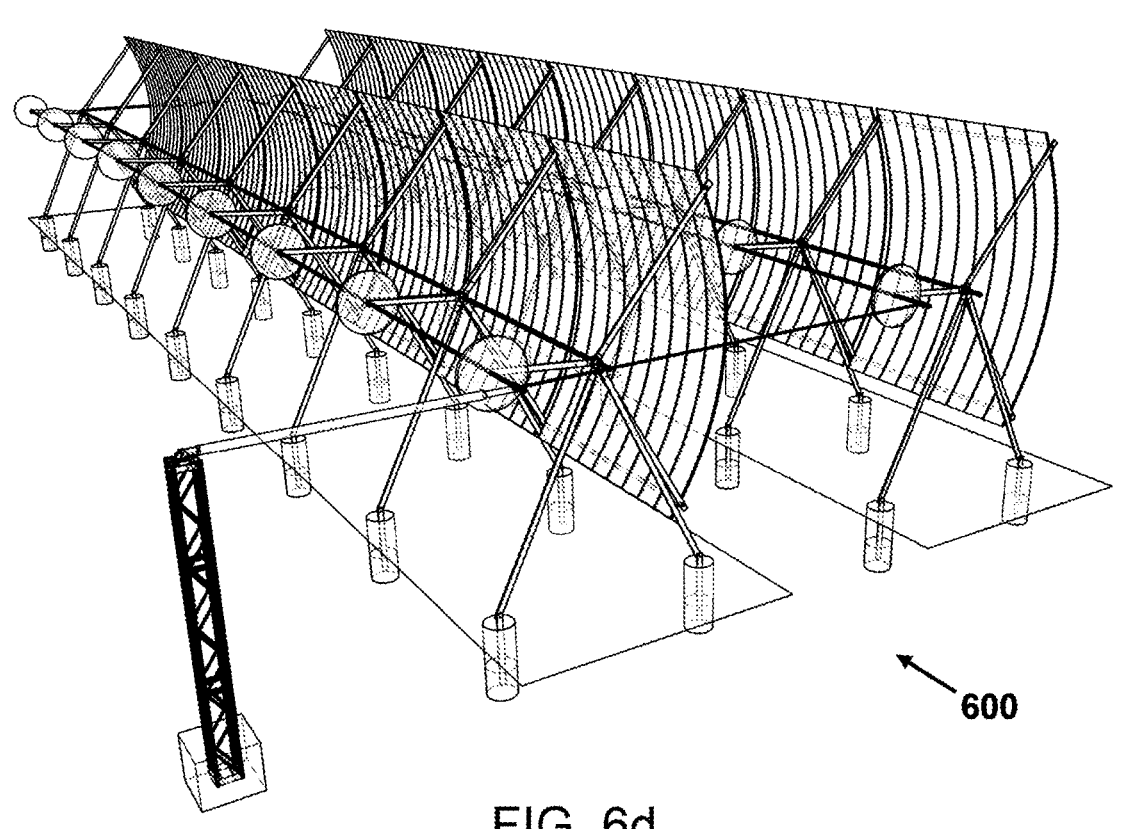
FIG. 6*d* shows the solar collector assembly of FIG. 6*a* in a second configuration.

FIG. 6d shows the solar collecting assembly 600 in a second configuration with the extendable arm 612 fully retracted, such that the upper tubes 140 of the modules 100 are displaced towards the hydraulic ram assembly 610, and the parabolic trough reflectors 120 both face towards the hydraulic ram assembly 610. This arrangement may be used at sunset if the hydraulic ram assembly 610 is arranged to the east of the modules 100, or at sunrise if it is arranged to the west of the modules 100.

The illustrated solar collector assembly 600 comprises two rows of solar collector modules 100, but it will be appreciated that any number of additional solar collector module rows may be added to such an assembly 600, with each additional row having a solar collector module with its upper tube 140 connected to the upper tube 140 of a module 100 in a preceding row with an additional linkage 620 and pair of rotating collar assemblies 630.

In some such embodiments, ends of the rigid fixed length linkage 620 and/or the extendable arm 612 may be connected to the parabolic trough reflectors 120 of one or more of the solar collector modules 100, or elements such as upper tubes 140 that are fixed and/or rigidly connected thereto, by rotating collars 636 and/or rotating collar assemblies 630.

FIG. 6b shows a rotational collar assembly connecting the end of the extendable arm 612 and an end of the linkage 620 to the upper tube 140 of the first solar collector module 100. The rotational collar assembly comprises a sleeve 632 fitted over an end of the upper tube 140 and secured thereto by a bolt 634. The exterior of the sleeve 632 is threaded and collars 636 are screwed onto this thread exterior. The collars 636 each comprise two tabs 638 extending from opposite sides thereof. One of the tabs 638 extending from each collar 636 is inserted into and bolted to an end of the extendable arm 612 or linkage 620 to which that collar 636 is secured.

The illustrated collar assembly 630 comprises two collars 636 in order to connect the upper tube 140 to both the end of the extendable arm 612 and an end of the linkage 620. It will be appreciated that other collar assemblies 630, such as the second collar assembly 630 shown in FIG. 6a, may comprise only a single collar 636 as they only connect a single element (such as the linkage 620) to an upper tube 140.

In some embodiments, solar collector systems may further comprise one or more storage tanks 710 for working fluids, means 740, 750 for pumping working fluid through the conduits, and/or heat exchangers 770 for extracting heat from the working fluid.

Figure 7A:
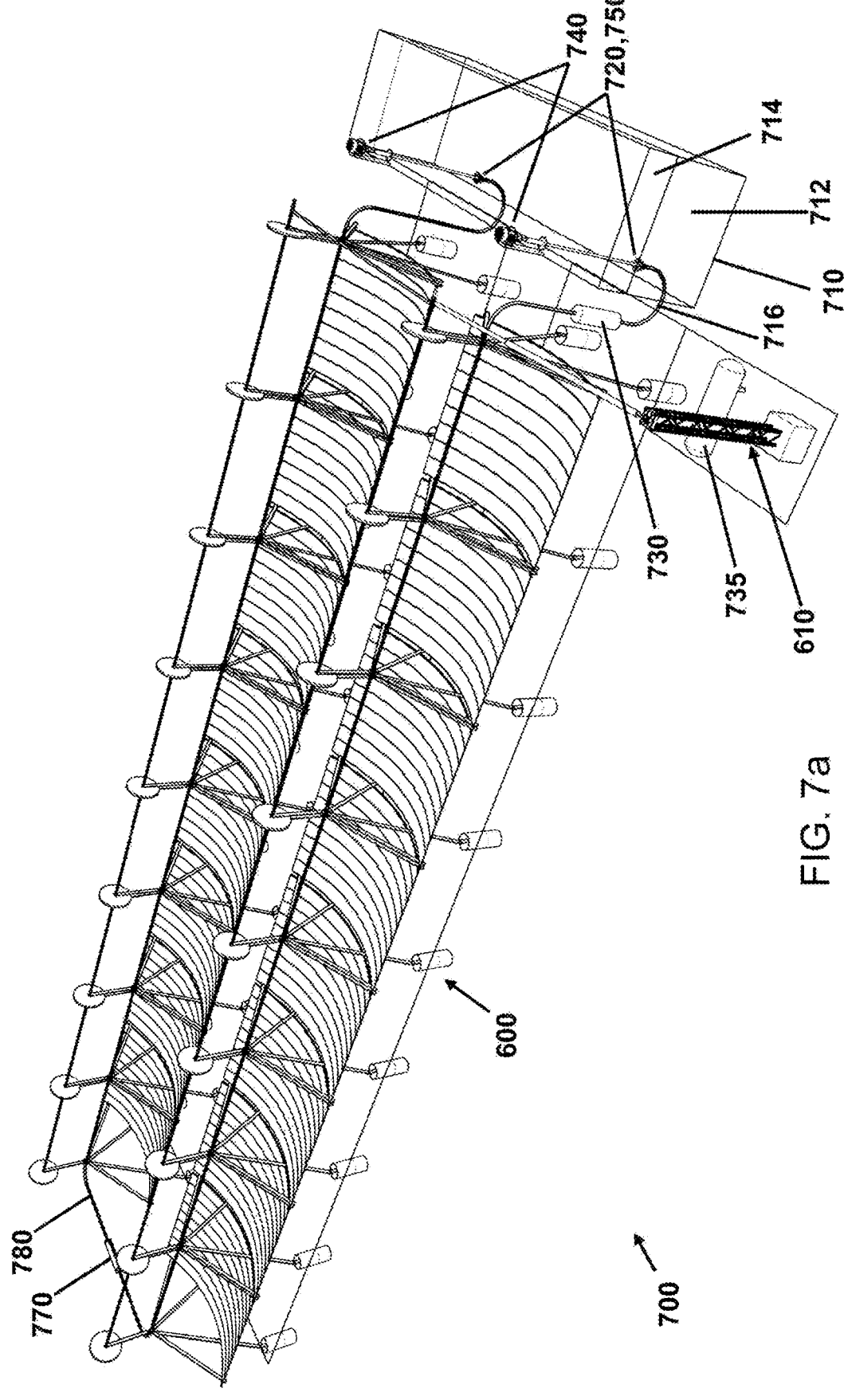
FIG. 7*a* shows a system comprising the solar collector assembly of FIG. 6*a;*

FIG. 7a shows an example of a system 700 comprising a solar energy assembly 600 as described above, a storage tank 710 for a working fluid, and a heat exchanger 770 for extracting energy from working fluid heated by the solar energy assembly 600.

In the illustrated system 700, the working fluid 712 is a molten salt, specifically a Molten Corrosive Heat Transfer Fluid (MCHTF). Molten salts such as MCHTFs make excellent heat transfer fluids, due to their high thermal conductivity, high thermal stability, and low viscosity. However, molten salt working fluids have high melting points so it is necessary to prevent their temperatures from falling too low such that they freeze within conduits or storage tanks.

The tank 710 is partially filled with the MCHTF 712 to a level that can rise and fall depending upon an amount of MCHTF added. The remainder of the tank 710 is filled with an inert gas 714 in order to prevent contact of the MCHTF 712 with air. The tank 710 is thermally insulated to retain any heat of the MCHTF 712.

The tank 710 may be a thermocline storage tank comprising a region of relatively cold MCHTF and a region of relatively hot MCHTF, separated by a portion of MCHTF with a temperature gradient (or thermocline).

The tank 710 comprises a pair of openings 720 defining an inlet and an outlet for MCHTF. An impeller 750 is arranged within each opening 720 for driving the MCHTF 712 into or out of the tank 710. Each of the two impellers 750 is driven by a respective motor 740 located outside the tank 710. In use the two motors 740, and the two impellers 750 may spin in opposite directions, such that the MCHTF 712 is pumped out of the tank 710 through one of the openings 720 and back into the tank 710 through the other.

A fluid pathway through the conduits 110 of the solar collector modules 100 and an integrated in-line heat exchanger 770 interconnects the two openings 720 to define a closed loop, such that driving the impellers 750 in opposite directions drives the MCHTF 712 along the pathway through the conduits 110 and the heat exchanger 770.

The pathway comprises a first pipe 716 interconnecting a first opening 720 of the tank 710 and a first end of a first solar collector module conduit 110 and a second pipe 716 interconnecting a second opening 720 of the tank 710 and a first end of a second solar collector module conduit 110. The second ends of the first and second solar collector module conduits 110 are interconnected by a pipe-way 780 comprising the heat exchanger 770. The pipes 716 and/or pipe-way 780 may be thermally insulated. The heat exchanger 770 is located close to the solar collector modules 100 in order to maximise efficiency.

Figure 7B:
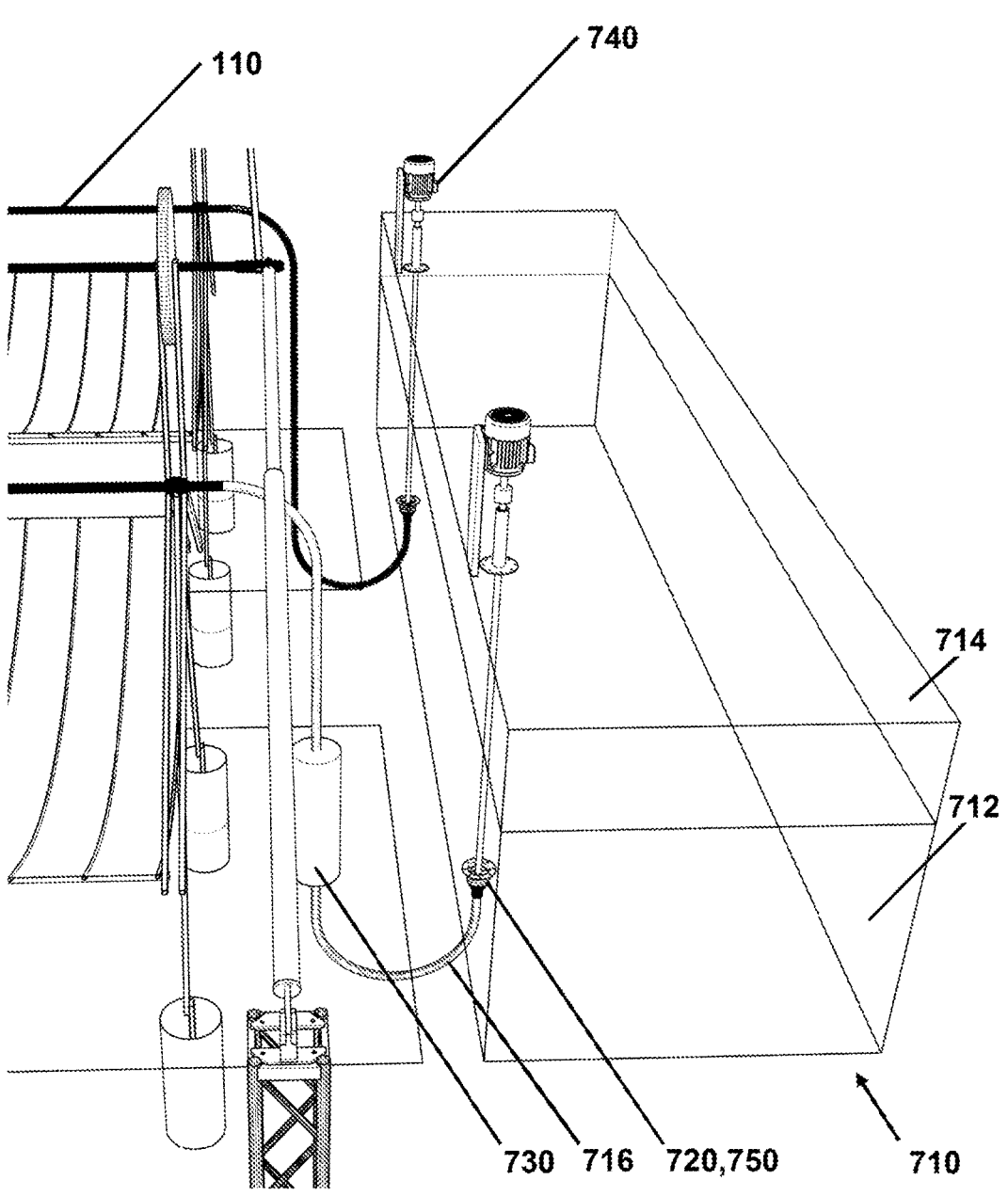
FIG. 7*b* shows a detailed view of the storage tank of the system of FIG. 7*a;*

FIG. 7b shows the storage tank 710 and its connections to the conduits 110 of the solar collector modules 100 in detail.

In alternative systems comprising more than two solar collector modules 100, the pathway between the openings 720 of the tank 710 may extend through the conduits 110 of all of the modules 100. For example in a winding pattern that interconnects adjacent conduit ends.

The system 700 comprises a blast furnace 730 located part way along the pathway between the openings 720. In the illustrated system 700, the blast furnace is located part way along a pipe 716 between the tank 710 and one of the conduits 110. However, in alternative embodiments, the blast furnace 730 may be provided elsewhere along the pathway, for example on the pipe-way 780 interconnecting conduit ends, or may be integrated with the storage tank 710.

The blast furnace 730 is fueled with gas from a gas tank 735 and is arranged to heat MCHTF being passed through it. The blast furnace 730 is inactive during normal operation of the system 700. However, in the event that solar energy is unavailable for an extended period, such that the MCHTF 712 cannot be heated by pumping it through the conduits 110 of the solar collector modules 100, the blast furnace 730 may be activated and the MCHTF 712 may be pumped around the pathway such that it is heated as it passes through the blast furnace 730. This may advantageously prevent the MCHTF 712 from freezing.

Conventional Thermal Energy Storage (TES) systems operate in such a way that the fluid present in a cold storage tank absorbs the heat into the HTF and is pumped to a hot storage tank. Thereafter, heat can be reclaimed from the hot tank by pumping the HTF though a heat exchanger to generate steam and then back into the cold storage tank. Typical applications use a two tank TES system, some distance from the solar collection devices. The transport of the HTF is costly, inefficient, complicated, and requires significant infrastructure. Moreover, this type of system uses expensive high temperature pumps which operate in a corrosive environment, and can lead to a number of difficulties.

Figure 7C:
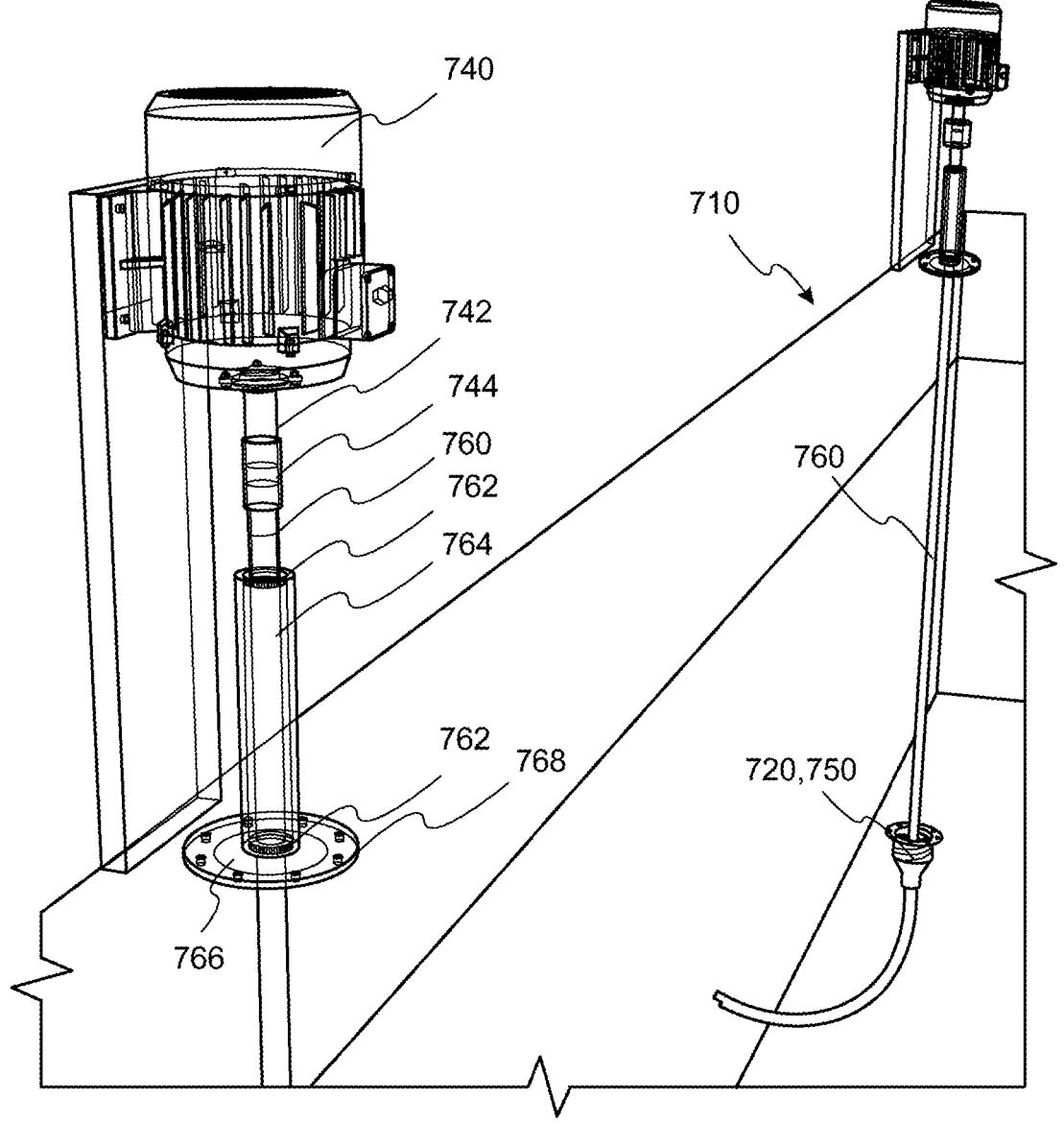
FIG. 7*c* shows a detailed view of the motor and impeller mechanism of the storage tank of FIG. 7*b;*

FIG. 7c shows a detailed view of the electric motors 740 and their connection to the impellers 750. Each motor 740 comprises an electric motor shaft 742 which is connected to an impeller shaft 760 via an insulating tube 744, which acts as a thermal break between the shafts 742, 760, such that the electric motor 740 does not excessively conduct heat from the MCHTF 712 within the tank 710.

The impeller shaft 760 extends into the storage tank 710 through an aperture 766 in the top of the tank 710 that is large enough for an impeller 750 to inserted into and withdrawn from the tank 710 there-through.

The aperture 766 is sealed by a flange 768 that is bolted to the storage tank 710 and which has a central opening through which the impeller shaft 760 extends. A shaft-supporting tube 764 extends upwards from the flange and holds the impeller shaft 760, which extends through it, in a vertical arrangement aligned with an impeller 750 within the tank 710. The shaft-supporting tube 764 is welded to the flange and covers a portion of the impeller shaft 760 between the flange 768 and the insulating tube 744. Impeller shaft bearings 762 are located within the shaft-supporting tube 764 at each of its ends, such that the impeller shaft 760 is free to rotate with respect to shaft-supporting tube 764, the flange 768 and the tank 710.

The electric motors 740 and bearings 762 being located outside the storage tank 710 prevents them being exposed to the corrosive MCHTF 712, prolonging their lifetime.

Figure 7D:
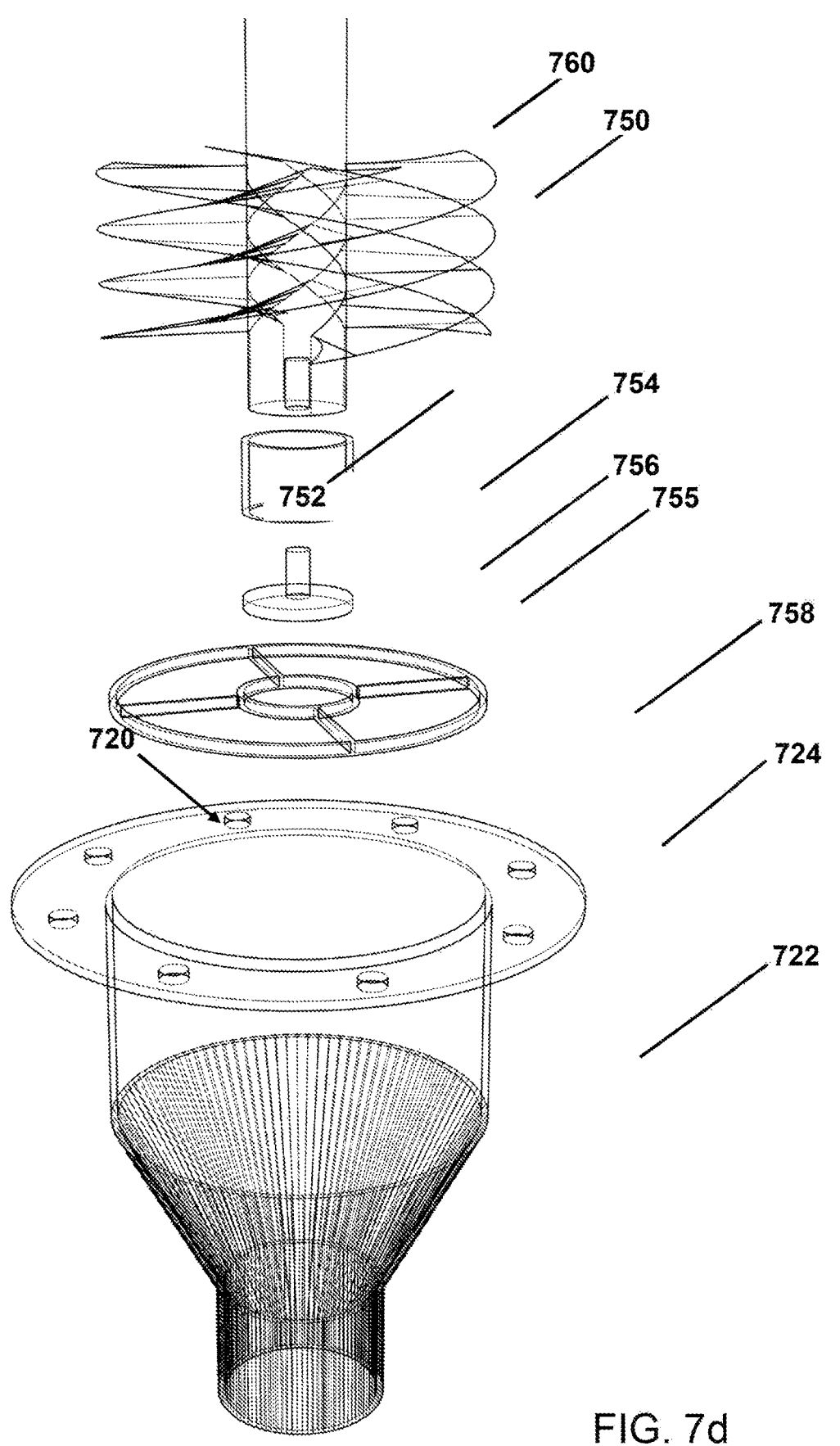
FIG. 7*d* shows an exploded view of the impellers of the storage tank of FIG. 7*b;*
Figure 7E:
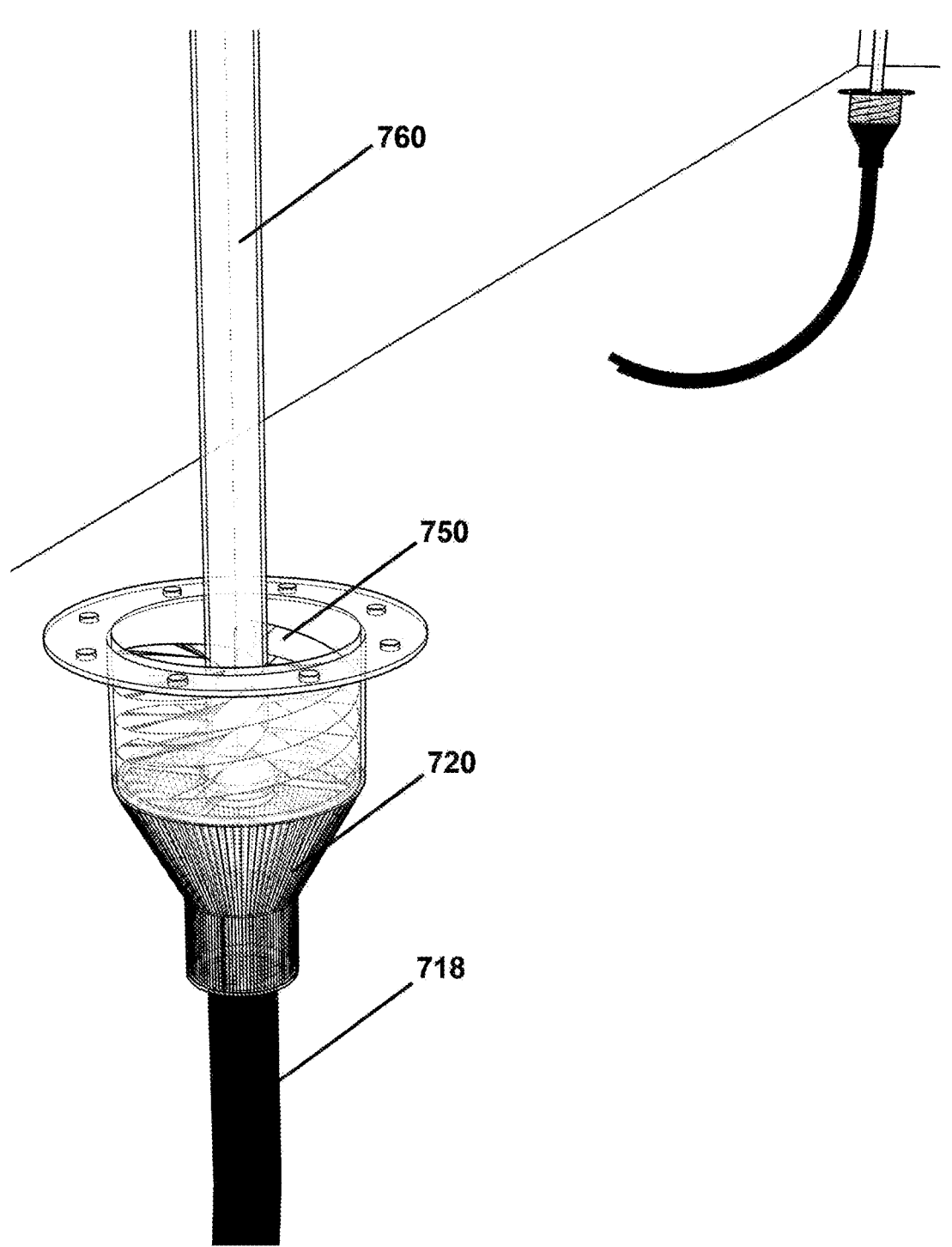
FIG. 7*e* shows a detailed view of an impeller of the storage tank of FIG. 7*b;*

FIG. 7d shows a detailed exploded view of an impeller 750 and a housing 722 located within one of the openings 720 of the storage tank 710. FIG. 7e shows an assembled view of the two impellers 750 located within the housings 722 of the two openings 720.

The impeller 750 is located at an end of the impeller shaft 760 distal from the electric motor 740. In use the impeller is located within a housing 722 located in an opening 720 of the storage tank 710. The housing 722 is secured to the base of the tank by a flange 724.

The end of the impeller shaft 760 is held in the centre of the housing 722 by an assembly comprising an impeller locating frame 758 that extends between opposing walls of the housing 722, a bearing retention screw 755 with a threaded portion 756 that is supported in the centre of the housing 722, and a graphite bearing sleeve 754 that is supported within a central aperture of the impeller locating frame 758 and which surrounds the end of the impeller shaft 760. The threaded portion 756 of bearing retention screw 755 is received by a threaded hole 752 in the end of the impeller shaft 760.

Figures 7F, 7G:
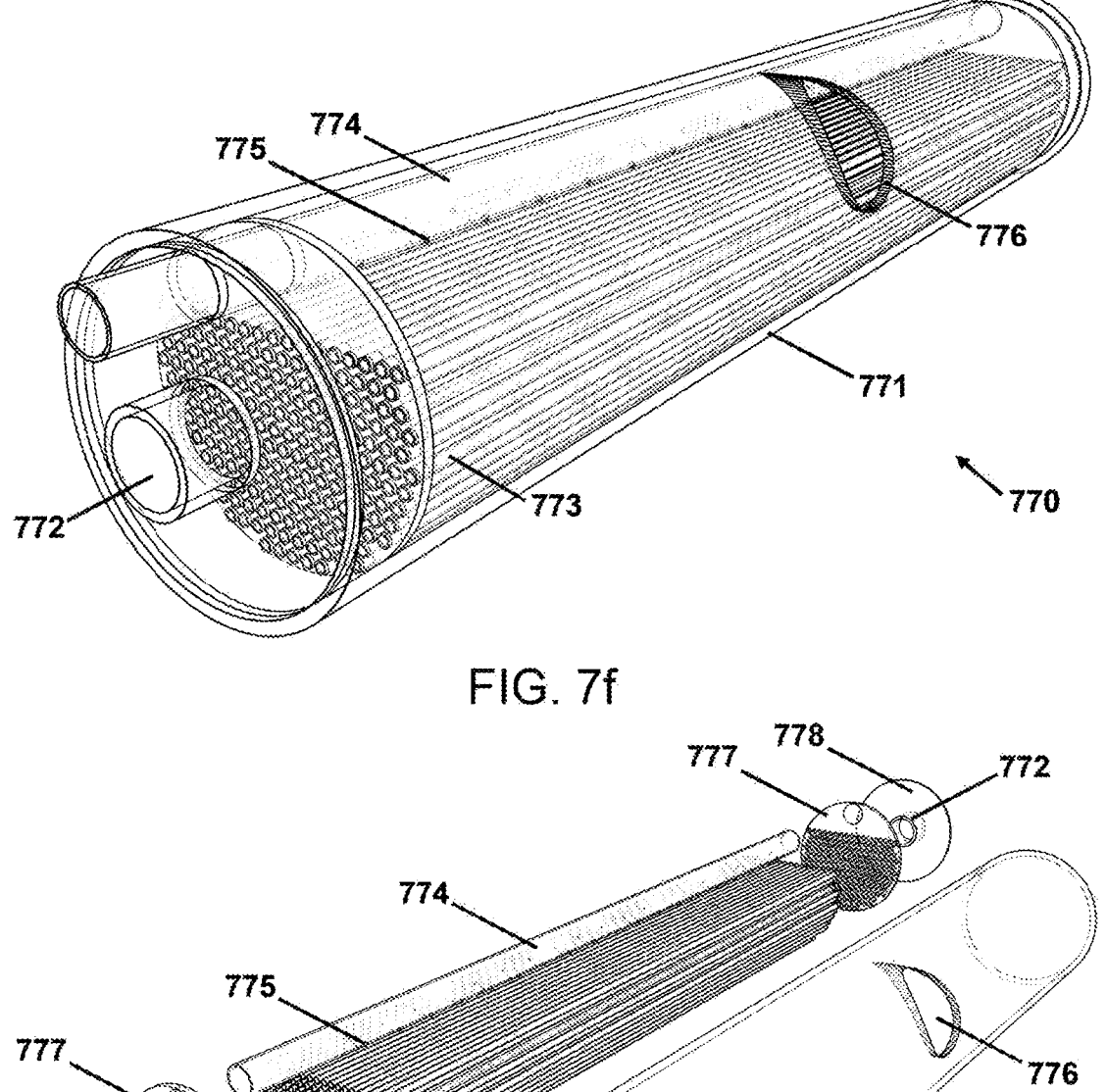
FIG. 7*f* shows a detailed view of the heat exchanger of the system of FIG. 7*a;*
FIG. 7*g* shows an exploded view of the heat exchanger of the system of FIG. 7*a;*

FIGS. 7f and 7g show detailed assembled and exploded view of the heat exchanger 770 of the system 700 respectively. The heat exchanger 770 is preferably located as close as possible to the solar collectors of the system, in order to minimise any heat losses.

The heat exchanger 770 is a shell-and-tube heat exchanger comprising an elongate cylindrical housing 771 divided into an elongate cylindrical central chamber and two short cylindrical end chambers. The end chambers connect inlets and outlets 772 of the heat exchanger to a bundle of narrow tubes 773 that extend across the central chamber, such that MCHTF passing through the heat exchanger passes through these narrow tubes 773. Within the central chamber, feed water is sprayed onto the narrow tubes 773 from a feed water pipe 774 such that it is heated to create steam.

The central chamber is defined between two interior walls 777 that separate it from the end chambers, and each of the end chambers is defined between one of the interior walls 777 and an end wall 778. The interior walls 777 each comprise an array of apertures opening into the ends of the narrow tubes 773. One of the interior walls 777 additionally comprises an aperture for the feed water pipe 774 to enter the central chamber. The other interior wall 777 is arranged to block an end of the feed water pipe 774 such that water pressure within the feed water pipe can be increased by pumping water into the feed water pipe 774. The feed water pipe comprises a series of nozzles 775 along its length, through which pressurized water is sprayed onto the narrow tubes 773 in use. The spray nozzles 775 may comprise valves configured to only open when the pressure within the feed water pipe 774 exceeds a threshold.

In alternative embodiments, different heat exchangers may be used to extract heat from a working fluid such as MCHTF heated by the system 700. Alternatively, or additionally, a heat exchanger may be located in between the conduit 110 of one of one of the solar collector modules 100 and the opening 720 at which the working fluid is pumped into the storage tank 710.

In some embodiments, the generated steam may escape the central cavity through an exhaust 776 through a sidewall of the heat exchanger housing 771. This steam may be used to drive a turbine for electricity generation. In other embodiments, the steam may be provided to one or more hydro-steam pistons 820 as described below.

Figure 10A:
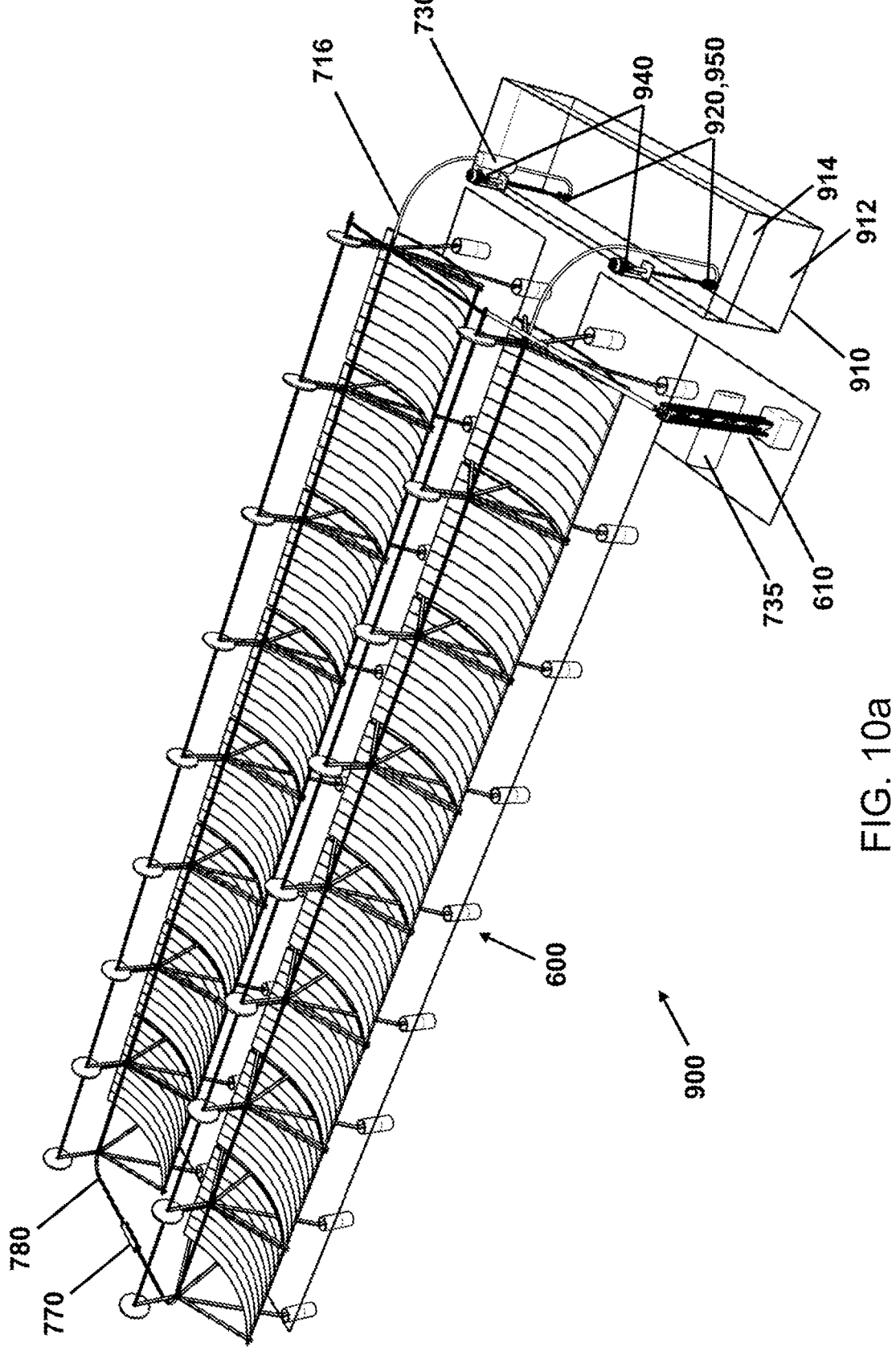
FIG. 10*a* shows an alternative system to the system of FIG. 7*a;*

FIG. 10*a* shows an example of an alternative system 900 also comprising a solar energy assembly, an alternative storage tank 910, and a heat exchanger 770 for extracting energy from working fluid heated by the solar energy assembly 900. This alternative system 900 is described in detail below with reference to FIGS. 10*a* to 10*e*.

Figure 8A:
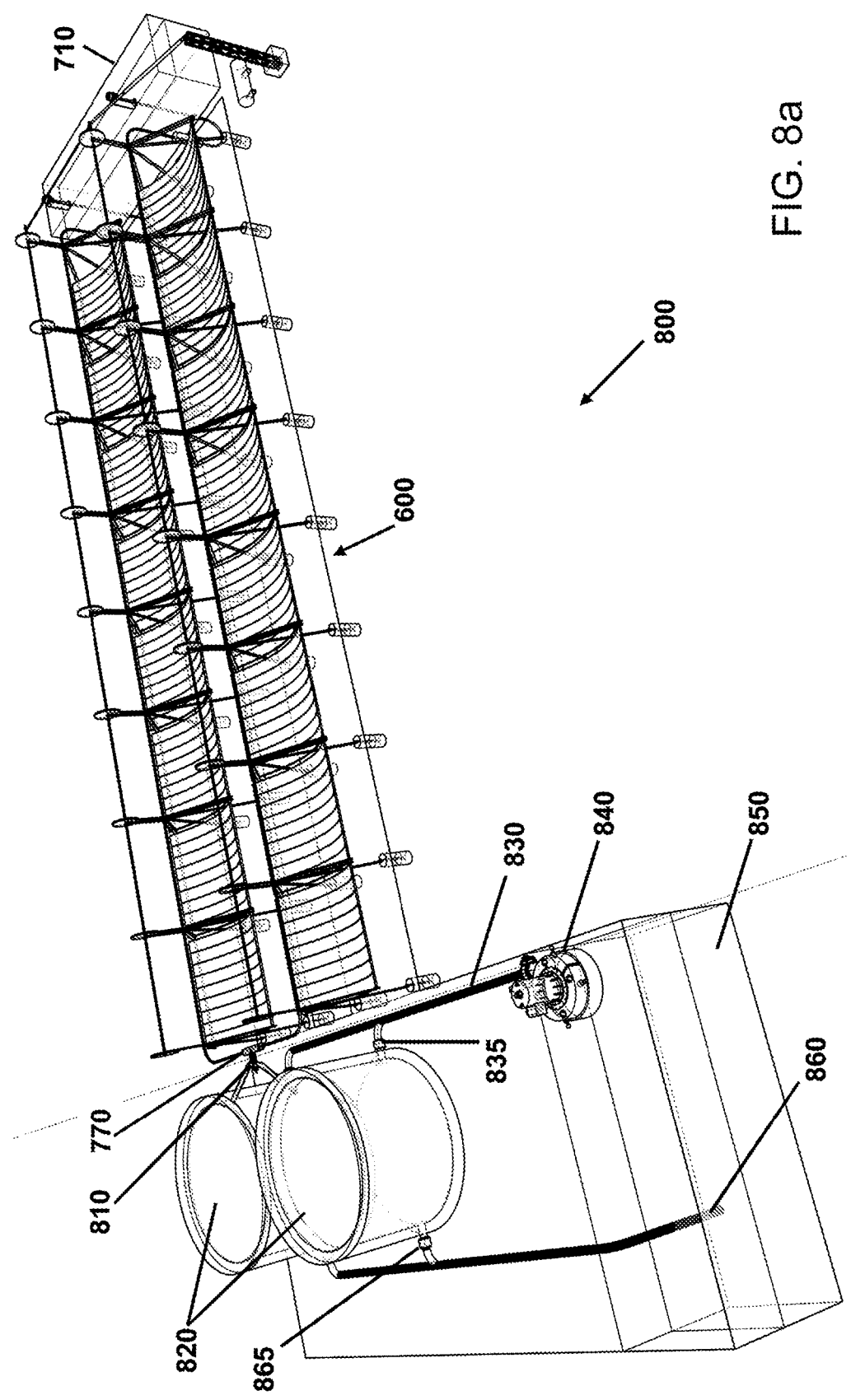
FIG. 8*a* shows a system as shown in FIG. 7*a* further comprising a piston and turbine assembly.
Figure 8B:
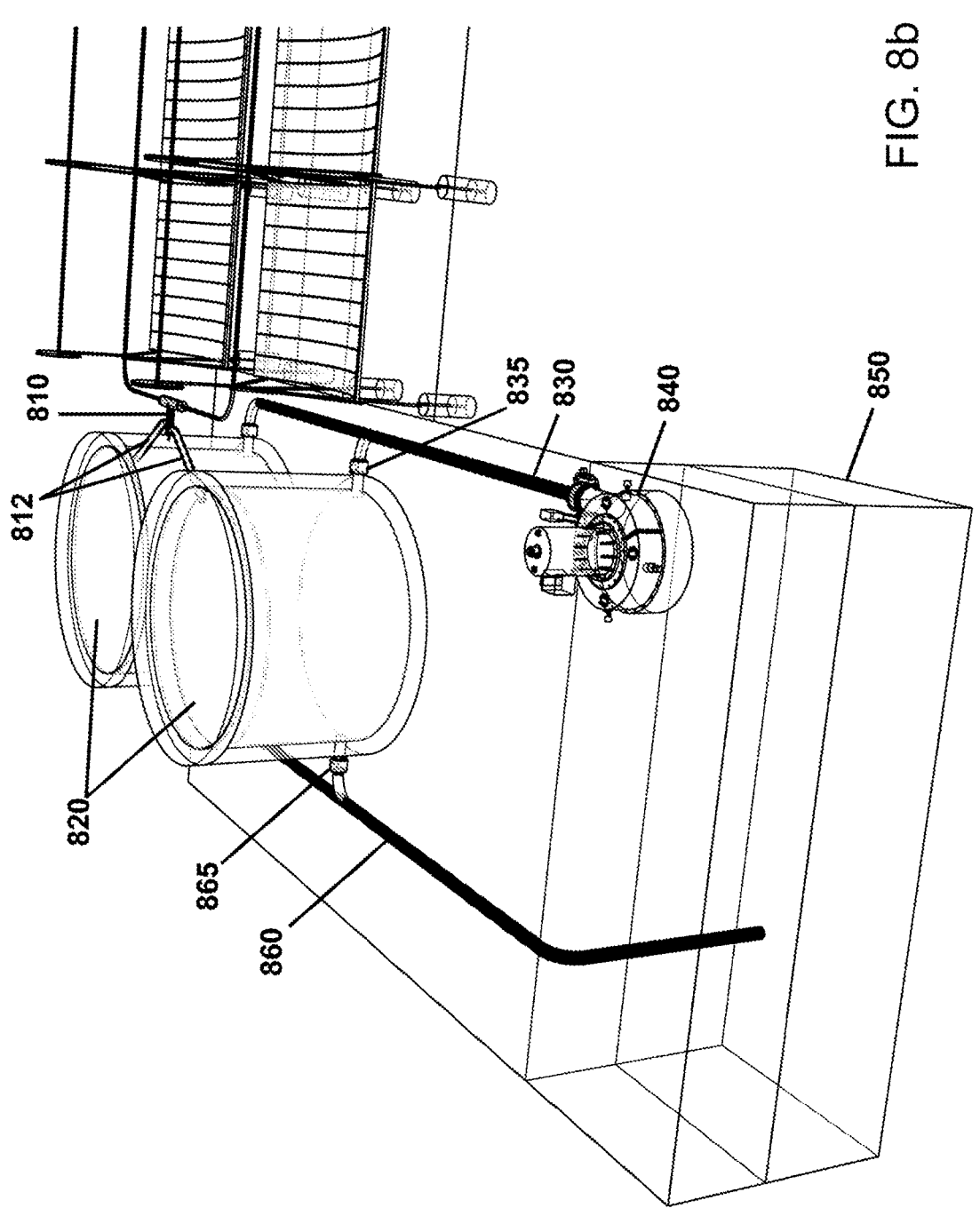
FIG. 8*b* shows a detailed view of the piston and turbine assembly of the system of FIG. 8*a;*

FIG. 8*a* shows an embodiment of a system 800 as described above with reference to FIG. 7*a* to 7*g*, further comprising a piston and turbine assembly, which is shown in detail in FIG. 8*b*. The piston and turbine assembly comprises a high-pressure steam distribution valve (HPSDV) 810, two hydro-steam pistons (HSPs) 820, an HSP outlet pipe 830, a water turbine 840, a cold-water reservoir 850, and an HPS inlet pipe 860.

The HPSDV 810 is connected between the steam exhaust 776 of the heat exchanger 770 and steam inlets of each of the two HSPs 820. In use, the HPSDV 810 alternately channels steam from the heat exchanger 770 into the top of the cylinder of one of the two HSPs 820. Simultaneously, cold water is sprayed into the top of the cylinder of the other of the two HSPs 820.

Channeling steam into the top of the first HSP 820 increases the pressure of the interior of the cylinder of that HSP 820, and of water contained therein. Water is therefore forced out of the HSP 820 through a one way valve 835 and along the HSP outlet pipe 830 to the water turbine 840. The water passes through the water turbine 840 into the cold-water reservoir 850, thereby generating electricity.

Conventional steam turbines are high precision devices, and are expensive to manufacture. Water is nearly eight hundred times denser than air and more effective at generating electricity than steam because of its greater density. Water turbines require less precision and are much cheaper than steam turbines. Conventional water turbines require a given volume of water and hydrostatic pressure. Hydrostatic force is pressure exerted by a fluid downwards due to the force of gravity. Water turbines are typically fed from a body of water above the turbine inlet and the difference in pressure to that of atmospheric pressure is referred to as head pressure. However, without a reservoir of water to supply the required volume and pressure of water, the turbine will not generate electricity. In the illustrated system 800, a water turbine 840 is provided with pressurised water from the HSPs 820 at the same height as the turbine 840, within which water is pressurised by steam from the heat exchanger 770.

In other embodiments, a single turbine 840 may be connected to and configured to receive pressurised water from multiple pairs of HSPs 820, which may receive steam generated by different sets of solar collector modules 100, or different solar collector systems 600, 700 as described above. The size of the turbine 840 may be selected to correspond to the size and number of HSPs 820 that provide water thereto.

Spraying cold water into the top of the cylinder of the other HSP 820 cools the cylinder which creates a partial vacuum therein, drawing water into that HSP 820 from the cold-water reservoir 850 via the HPS inlet pipe 860, and a one-way valve 865 thereof. This allows the contraction of steam within the pistons to do work, in addition to the work done during the upper chamber's expansion.

Figure 8C:
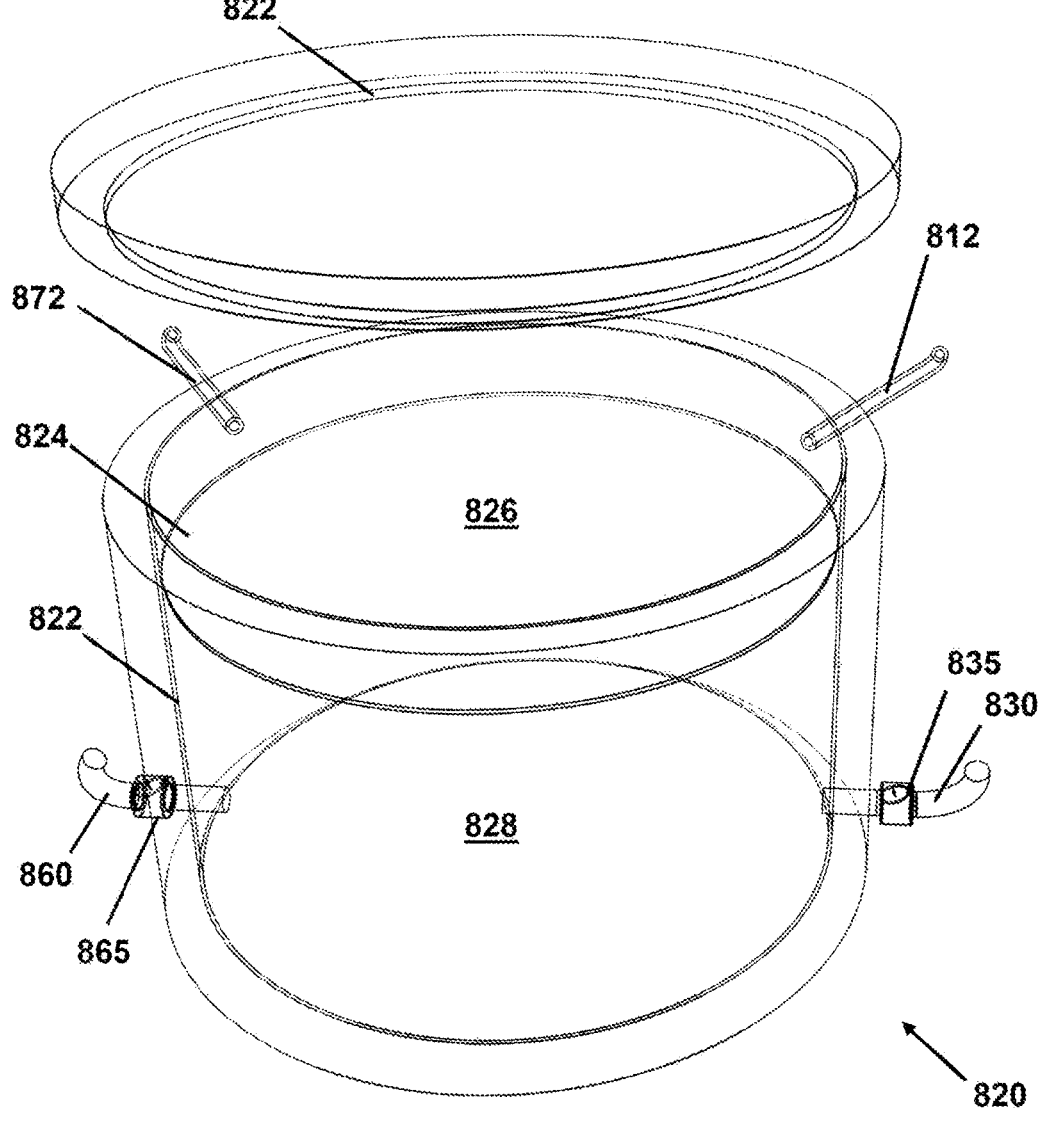
FIG. 8*c* shows a detailed view of a hydro-steam piston of the system of FIG. 8*a;*

FIG. 8*c* shows a detailed partially exploded view of a single Hydro-Steam Piston 820. The HSP comprises a cylindrical tank with a flat mechanically connected top. Cylindrical tanks may advantageously be suitable for containing highly pressurized fluids. In alternative embodiments, the HSP cylinders could comprise rounded or hemispherical ends.

A lower portion of the tank 828 is filled with water and an upper portion 826 of the tank contains steam. In use the height to which the tank is filled with water varies, increasing and decreasing the sizes of the upper and lower portions 826, 828. An insulating layer 822 is provided on the interior of the cylindrical sidewall and the top and thermally insulates the upper portion of the cylindrical tank containing the steam from the exterior of the tank, irrespective of the height to which it extends. Additionally, the upper portion of the tank is insulated from the lower portion 828 that contains water (which is a good thermal conductor and would otherwise conduct large amounts of heat away from the steam, causing it to quickly condense after entering the tank) by a floating insulating barrier disk 824 that floats on top of the water.

In the illustrated embodiment, the floating barrier disk 824 is slightly smaller in diameter than the cylindrical tank, allowing it to freely float up and down the tank as the water level rises and falls. Additionally, the small gap between the floating barrier disk 824 and the interior wall of the cylinder allows water that is sprayed into the upper portion 826 in use to fall into the lower portion 828, while keeping the non-thermally insulated portion of the boundary between the upper and lower portions 826, 828 small.

A steam inlet pipe 812 connected to the HPSDV 810 opens into the cylindrical tank near to its top, in order to allow steam to enter the upper portion 826 of the tank above the floating insulation disk 824. An outlet to the HSP outlet pipe 830 is located near the base of the cylindrical tank. As steam enters the upper portion 826 of the tank through the steam inlet pipe 812, the floating insulating disk 824 is displaced downwards and the hydrostatic pressure of the water in the lower portion 828 of the tank increases. Water from the lower portion 828 of the tank is driven out of the tank under this hydrostatic pressure. This is referred to as the 'Power Stroke' of the HSP 820.

The HSP 820 further comprises a cold-water spray pipe 872 that opens into the cylindrical tank near its top. In use, after the majority of the water within the tank is forced out of the cylinder tank, and the floating disk 824 is displaced to near the bottom of the tank, steam may be stopped from entering the tank by the HPSDV 810 and cold water may be sprayed into upper portion 826 of the tank from the cold-water spray pipe 872. This causes the steam in the upper portion 826 of the tank to contract, creating a vacuum effect and exerting an upward force on the floating disk 824. An inlet from the HSP inlet pipe 860 is located near the base of the cylindrical tank. As the vacuum effect is created by spraying cold water into the upper portion 826 of the tank from the cold-water spray pipe 872, cold water from the reservoir 850 is drawn into the lower portion 828 of the tank via the HSP inlet pipe 860, through a one-way valve 865 thereon adjacent the HSP 820. This is referred to as the 'Charge Stroke' of the HSP 820. The water sprayed into the tank, and steam that is condensed when cooled by the sprayed-in cold water, falls onto the floating barrier disk 824, and flows into the lower portion 828 of the tank via the small gap between the disk 824 and the interior wall of the cylinder, which further increases the height of the water level of the lower portion 828.

As one of the two HSPs 820 is performing its power stroke, the other may perform its charge stroke. This may allow a substantially constant flow of pressurised water to be driven along the HSP outlet pipe 830 to the water turbine 840, where it may be used to generate electricity. In other embodiments, the flow of pressurised water can be used for the desalinisation of brackish water or other forms of water purification.

The illustrated HSP cylinders 820 are made out of Polymer steel re-enforced concrete, however, in other embodiments they can also be made from steel, plastic, carbon fibre, glass, or fibre glass, or other suitable materials.

The size of the two HSPs 820 may be selected, in conjunction with a number of pairs of HPSs 820 that are connected to a single water turbine 840 (and the number of solar collectors providing heat thereto), such that the amount of potential energy that can be collected and stored in the HSPs 820 connected to a single turbine 840 is sufficient to generate electricity using that turbine 840 for 24 hours a day.

Figure 8D:
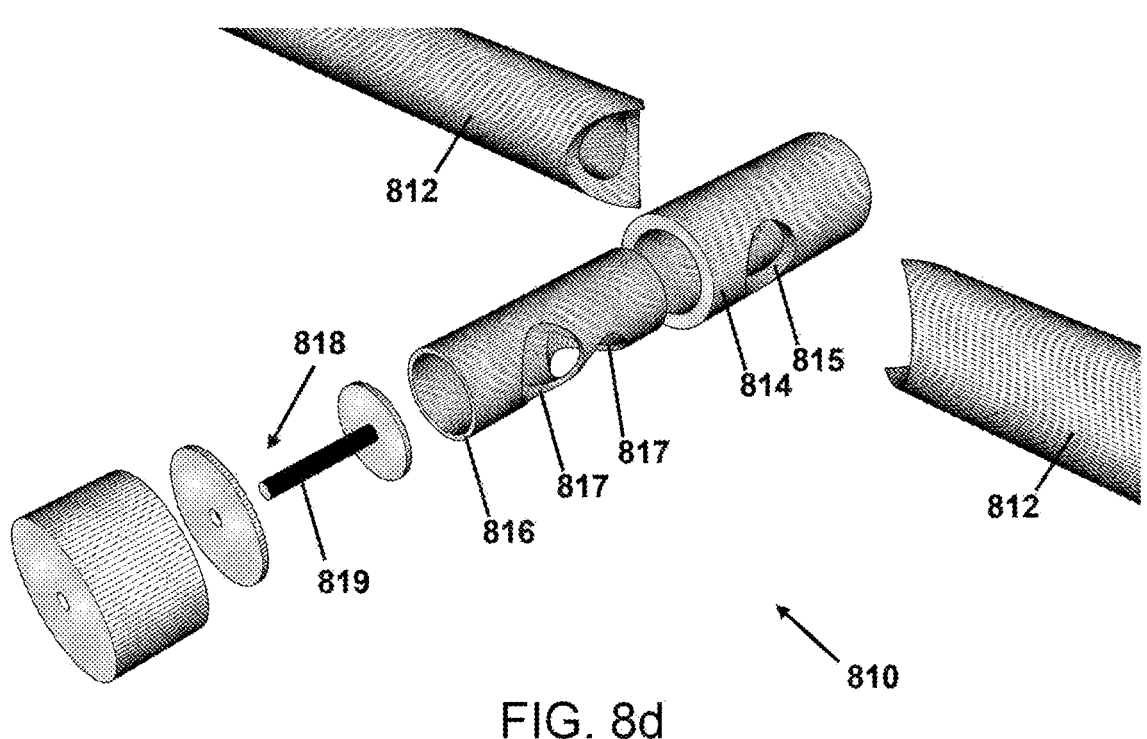
FIG. 8*d* shows an exploded view of the high-pressure steam distribution valve of the system of FIG. 8*a;*
Figure 8E:
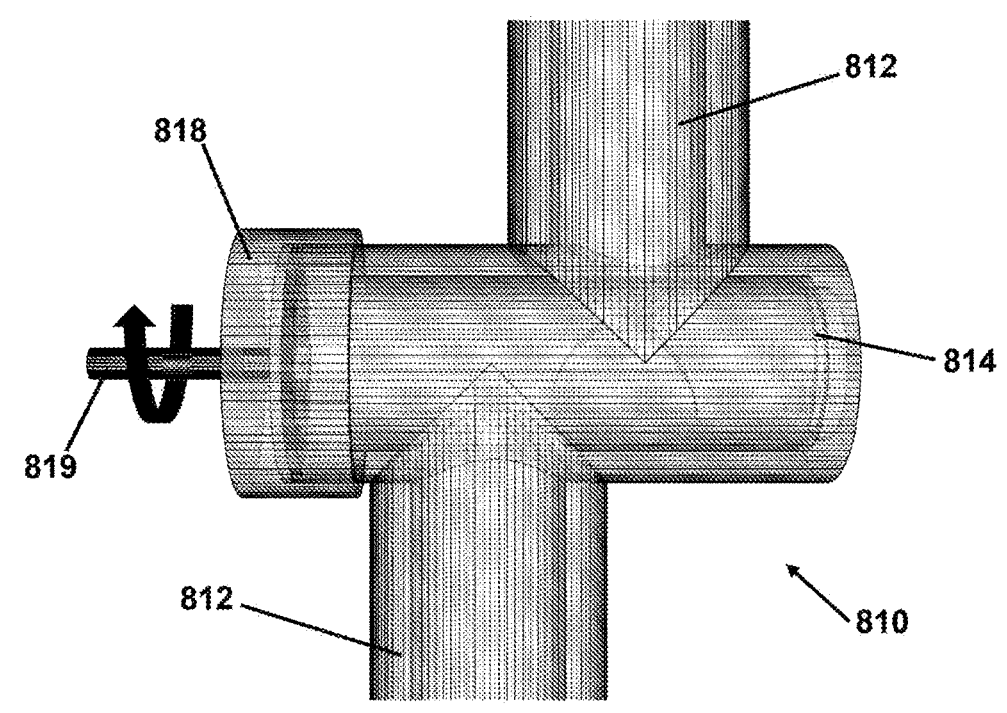
FIG. 8*e* shows a partially transparent assembled view of the high-pressure steam distribution valve of the system of FIG. 8*a;*

FIGS. 8*d* and 8*e* show exploded and partially transparent assembled view of the high-pressure steam distribution valve (HPSDV) 810. The HPSDV 810 connects the steam exhaust 776 of the heat exchanger 770 to the steam inlet pipes 812 of the two HSPs 820*s*.

The HPSDV 810 is configured to direct steam from the steam exhaust 776 into one of the two HSP cylinders 820 and is coupled to a spray valve 870 configured to simultaneously direct cold water to the other HSP cylinder 820 via its respective cold water spray pipe 872. The HPSDV 810 and coupled spray valve 870 thereby control the 'Power stroke' and 'Charge stroke' of the two HSP cylinders 820.

The HPSDV 810 comprises an outer body 814 with two offset lateral openings 815 on opposite sides and an inner rotating body 816 with two offset lateral openings 817 at 90 degrees to each other. As the inner rotating body 816 is rotated within and with respect to the outer rotating body 814, either one or neither of the two lateral opening 815 of the outer tube 814 may align with a lateral opening 817 of the inner tube 816. Each of the two lateral openings of the outer tube 814 is connected to an end of one of the two steam inlet pipes 812, such that steam is able to escape the HPSDV valve 810 to at most one of the steam inlet pipes 812 at a time, in dependence upon the relative orientation of the inner and outer tubes 814, 816.

One end of the inner tube 816 is open and configured to receive steam from the steam exhaust 776 and the other is covered by an end cap assembly 818 such that steam can only exit the inner tube through aligned lateral holes 815, 817. The end assembly comprises a disk connected to an end of a shaft 819, a graphite washer with a central hole through which the shaft extends, and an end cap with a central hole through which the shaft 819 extends. The shaft 819 connects the inner tube 816 to a lever 876 of the spray valve 870, such that the lever 876 rotates with the inner tube 816, and the HPSDV 810 is actuated simultaneously with the spray valve 870.

Figure 8F:
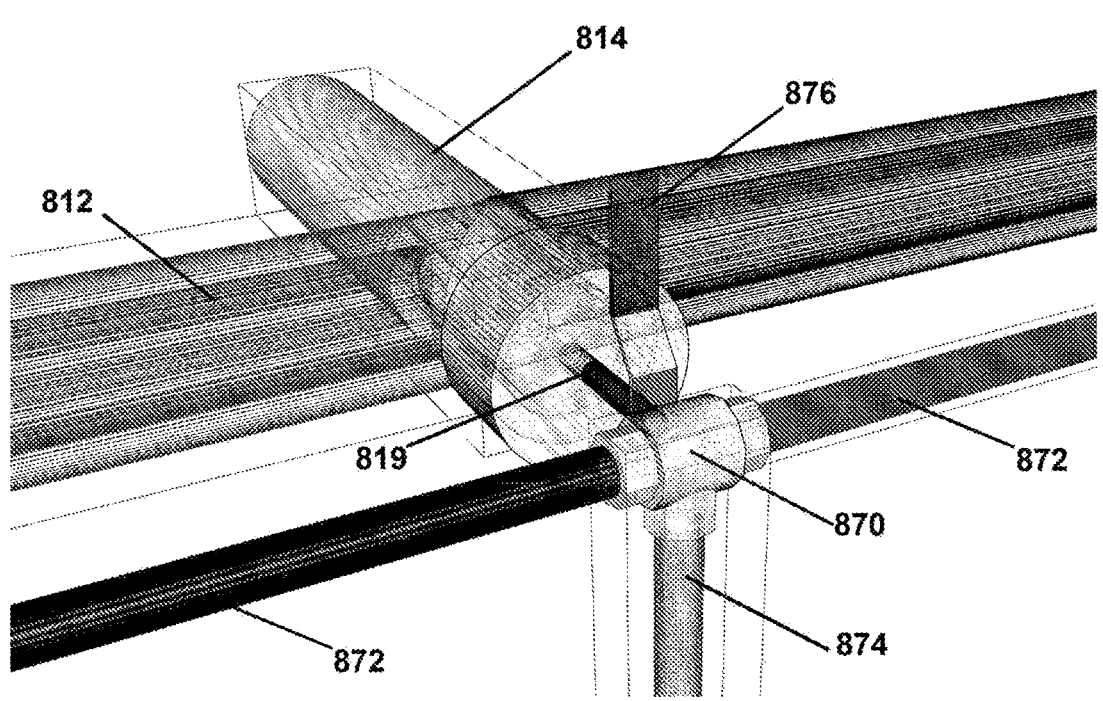
FIG. 8*f* shows the high-pressure steam distribution valve of FIG. 8*d* coupled to a spray valve in a first configuration.
Figure 8G:
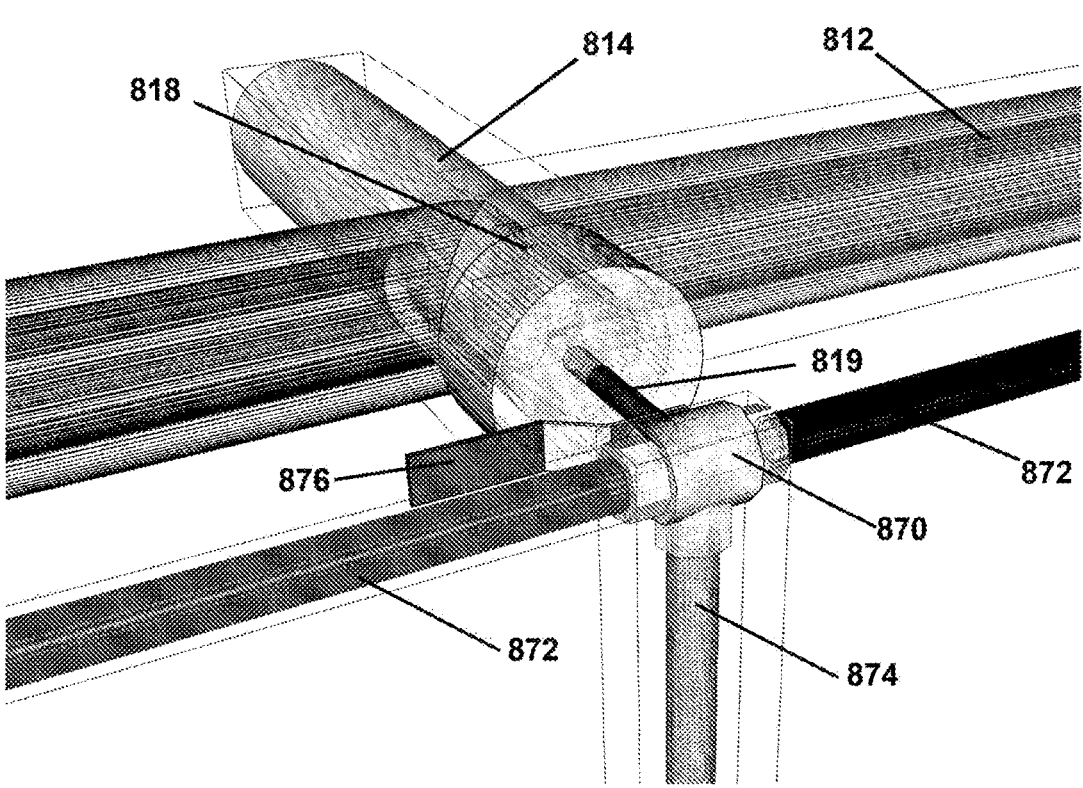
FIG. 8*g* shows the high-pressure steam distribution valve of FIG. 8*d* coupled to the spray valve in a second configuration.

FIGS. 8*f* and 8*g* show the HPSDV 810 coupled to the cold-water spray valve 870 in two different configurations for directing steam and cold-water spray to different HSP cylinders 820. The cold-water spray valve 870 is configured to alternately connect a supply pipe 874 to either of two cold water spray pipes 872.

In FIG. 8*f*, the lever 876 is in a first 'up' position, such that the spray valve 870 connects the supply pipe 874 to the left cold water supply pipe 872 to a first HSP cylinder 820, and the inner tube 816 coupled to the lever by the shaft 819 is rotated to align one of its lateral openings 817 with only a right-facing lateral opening 815 of the outer tube 814. Therefore steam from the steam exhaust 776 is directed down the right-most steam inlet pipe 812 to a second HSP cylinder 820. The first HSP cylinder 820 is therefore in its charge stroke and the second HSP cylinder is therefore in its power stroke.

In FIG. 8*g*, the lever 876 is in a second 'down' position, such that the spray valve 870 connects the supply pipe 874 to the right cold water supply pipe 872 to the second HSP cylinder 820, and the inner tube 816 coupled to the lever by the shaft 819 is rotated to align its other lateral opening 817 with the left-facing lateral opening 815 of the outer tube 814. Therefore, steam from the steam exhaust 776 is directed down the left-most steam inlet pipe 812 to the first HSP cylinder 820. The first HSP cylinder 820 is therefore in its power stroke and the second HSP cylinder 820 is therefore in its charge stroke.

The HPSDV 810 provides the functionality of a multi-channel ball valve without requiring any silicone, grease or plastic, and therefore can be used at very high temperatures and pressures. Additionally, the HPSDV 810 is self-sealing, as the greater the pressure in the inner tube 816, the harder the disc connected to the shaft 819 presses against the graphite washer of the end assembly 818, creating a better seal.

Figures 8H, 8I:
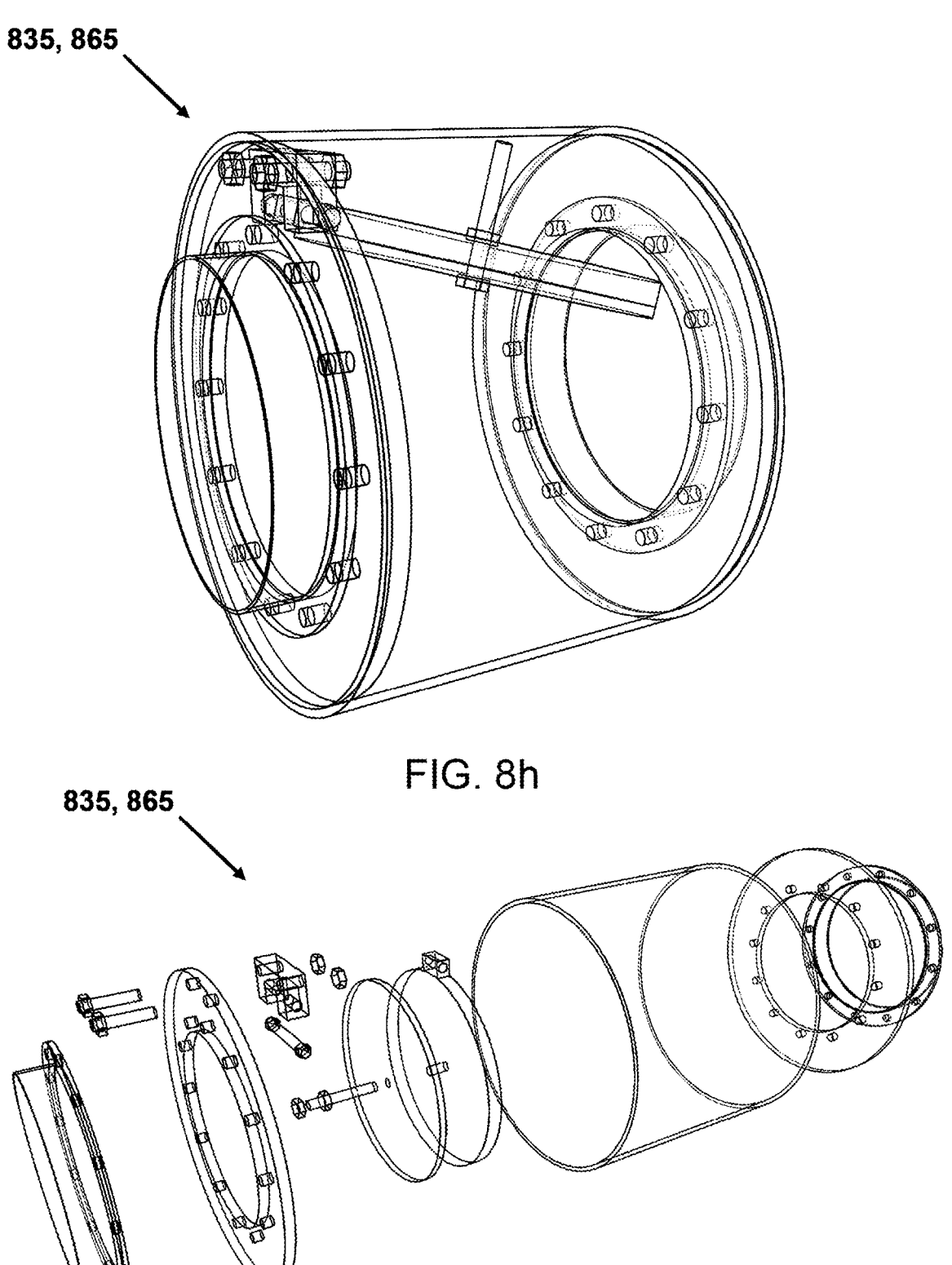
FIG. 8*h* shows a detailed view of a one-way valve of the system of FIG. 8*a;*
FIG. 8*i* shows an exploded view of the one-way valve of FIG. 8*h;*

FIGS. 8*h* and 8*i* show detailed and exploded view of a one-way valve 835, 865 as mounted on the HSP outlet pipe 830 and the HSP inlet pipe 860. The one-way valves comprise cylindrical housings with hinged valve plates. FIG. 8*h* shows the hinged valve plate in an open position, in which the valve will be arranged as water flows from the left to the right of the figure. If the direction of flow of the water is reversed, the valve plate will pivot into a closed position in which it blocks an opening of the valve and prevents a flow through the housing.

Figure 9:
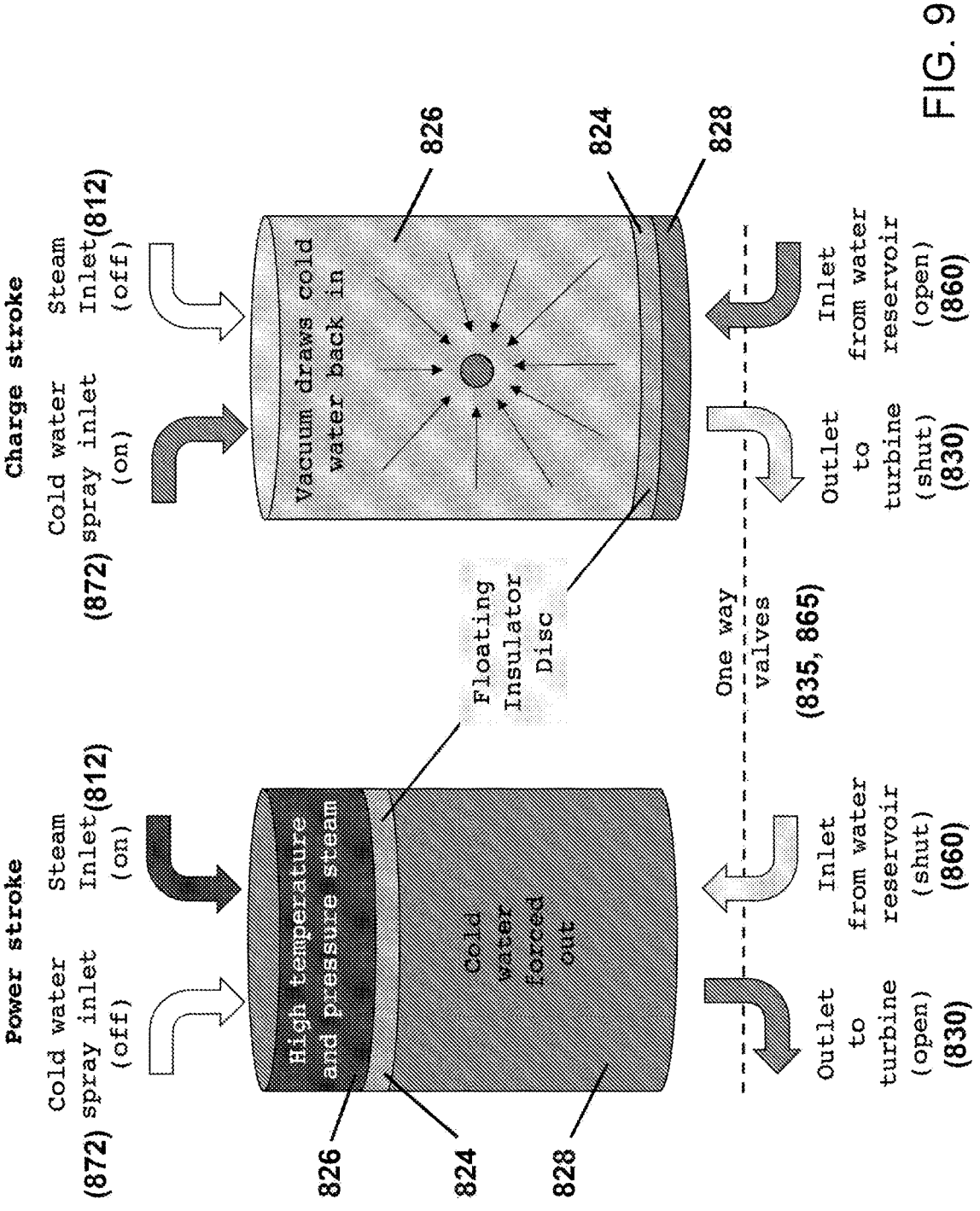
FIG. 9 shows a diagram of the hydro-steam piston of FIG. 8*c* in power.

FIG. 9 is a diagrammatic view of the two HPS cylinders 820 of the system 800 shown in FIG. 8*a*, while a first of the cylinders 820 is in its power stroke as high temperature and pressure steam enters its upper portion 826, increasing the hydrostatic pressure within its lower portion 828, driving water out through the HSP outlet pipe 830 to the turbine 840. The second of the cylinders is in its charge stroke, with cold water being sprayed into its upper portion 826, creating a vacuum that draws its floating insulating disk 824 upwards, drawing water into its lower portion 828.

Figure 10B:
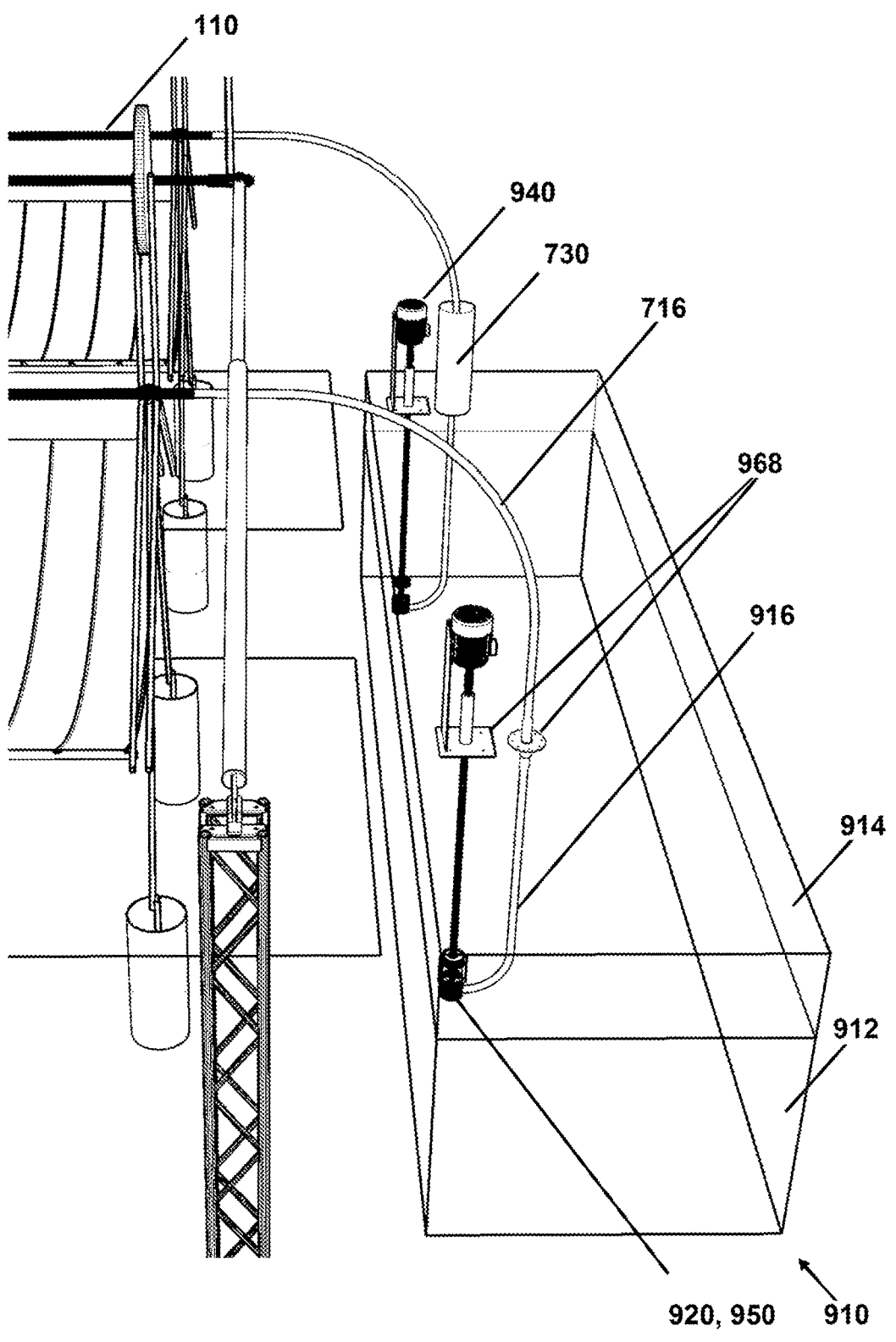
FIG. 10*b* shows a detailed view of the storage tank of the alternative system of FIG. 10*a;*

As described above, FIG. 10*a* shows an example of an alternative system 900 to the system 700 shown in FIG. 7*a*, which comprises an alternative storage tank 910. The system 900 also comprises the same a solar energy assembly 600 and heat exchanger 770 as the system shown in FIG. 7*a*. A detailed view of the alternative storage tank 910 is shown in FIG. 10*b*.

As in the system of FIG. 7a, the alternative system 900 uses a MCHTF working fluid 912 which at least partially fills a thermally insulated storage tank 910. Any remainder of the storage tank 910 may be filed within an inert gas 914. However, the tank comprises a different arrangement of inlets and outlets and their associated impellers.

Unlike the storage tank 710 shown in FIG. 7a (in which inlets and outlets 720 that define impeller housings are provided through the base of the storage tank 710) in the alternative storage tank 920, inlets and outlets 920 are defined by conduits 916 extending from openings through an upper face of the storage tank 910 to impeller housings 920 provided on the base of the storage tank 910.

An impeller 950 is arranged within each impeller housing 920 for driving the MCHTF 912 into or out of the tank 910. As in the storage tank 710 of FIG. 7a, each of the two impellers 950 is driven by a respective motor 940 located outside the tank 910. In use the two motors 940, and the two impellers 950 may spin in opposite directions, such that the MCHTF 912 is pumped out of the tank 910 through one of the impeller housing 920 and associated conduit 916 and back into the tank 910 through the other impeller housing 920 and associated conduit 916.

As in the system 700 of FIG. 7a, a closed-loop fluid pathway through the conduits 110 of the solar collector modules 100 and an integrated in-line heat exchanger 770 is defined between the two inlets and outlets of the storage tank 910, such that the working fluid may be driven along it by the impellers 950. Pipes 716 interconnect the inlets and outlets of the storage tank 910 to ends of the solar collector module conduits 110.

As with the system 700 of FIG. 7a, in alternative systems comprising more than two solar collector modules 100, the pathway between the inlet/outlets 920 of the impeller housings in the tank 910 may extend through the conduits 110 of all of the modules 100. For example in a winding pattern that interconnects adjacent conduit ends.

The system 900 comprises a blast furnace 730 located between one of the inlets and outlets of the storage tank and the connected conduit 110 of the solar collector. However, in alternative embodiments, the blast furnace 730 may be provided elsewhere along the pathway, for example on the pipe-way 780 interconnecting conduit ends, or may be integrated with the storage tank 910.

The blast furnace 730 is fueled with gas from a gas tank 735 and is arranged to heat MCHTF being passed through it. The blast furnace 730 is inactive during normal operation of the system 900. However, in the event that solar energy is unavailable for an extended period, such that the MCHTF 912 cannot be heated by pumping it through the conduits 110 of the solar collector modules 100, the blast furnace 730 may be activated and the MCHTF 912 may be pumped around the pathway such that it is heated as it passes through the blast furnace 730. This may advantageously prevent the MCHTF 912 from freezing.

Figure 10C:
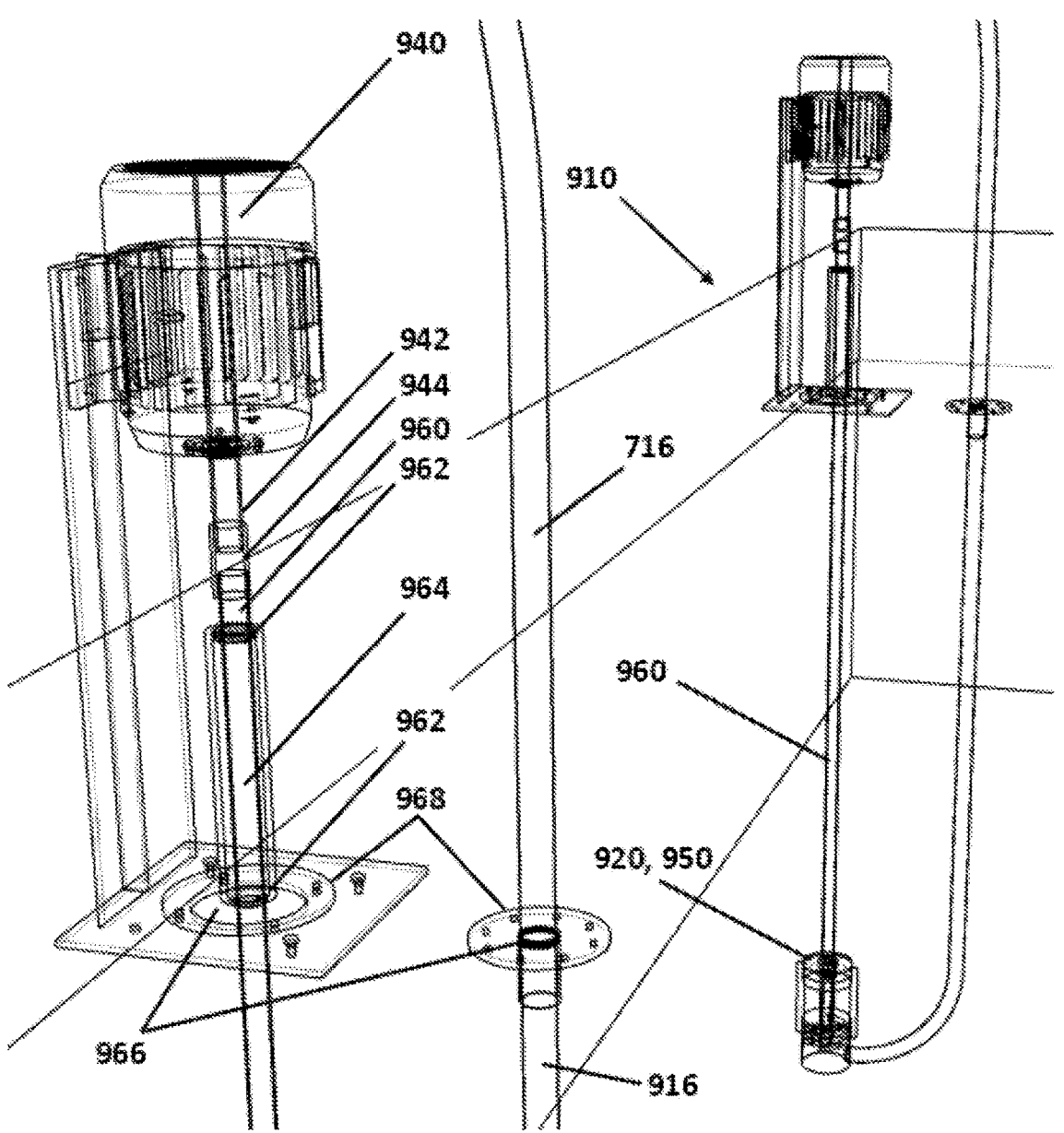
FIG. 10*c* shows a detailed view of the motor and impeller mechanism of the storage tank of FIG. 10*b;*

FIG. 10c shows a detailed view of the electric motors 940 and their connection to the impellers 950. Each motor 940 comprises an electric motor shaft 942 which is connected to an impeller shaft 960 via an insulating tube 944, which acts as a thermal break between the shafts 942, 960, such that the electric motor 940 does not excessively conduct heat from the MCHTF 912 within the tank 910.

The impeller shaft 960 extends into the storage tank 910 through an aperture 966 in the top of the tank 910 that is large enough for an impeller 950 to inserted into and withdrawn from the tank 910 there-through. The apertures 966 are sealed by flanges 968 which are bolted to the storage tank 910 and which each has a central opening through which the impeller shaft 960 extends. The conduits 916 defining the inlets and outlets also extend from apertures 966 sealed with flanges 968 bolted to an upper surface of the storage tank 910. A shaft-supporting tube 964 extends upwards from the flange and holds the impeller shaft 960, which extends through it, in a vertical arrangement aligned with an impeller 950 within the tank 910. The shaft-supporting tube 964 is welded to the flange and covers a portion of the impeller shaft 960 between the flange 968 and the insulating tube 944. Impeller shaft bearings 962 are located within the shaft-supporting tube 964 at each of its ends, such that the impeller shaft 960 is free to rotate with respect to shaft-supporting tube 964, the flange 968 and the tank 910. The electric motors 940 and bearings 962 being located outside the storage tank 910 prevents them being exposed to the corrosive MCHTF 912, prolonging their lifetime.

Figure 10D:
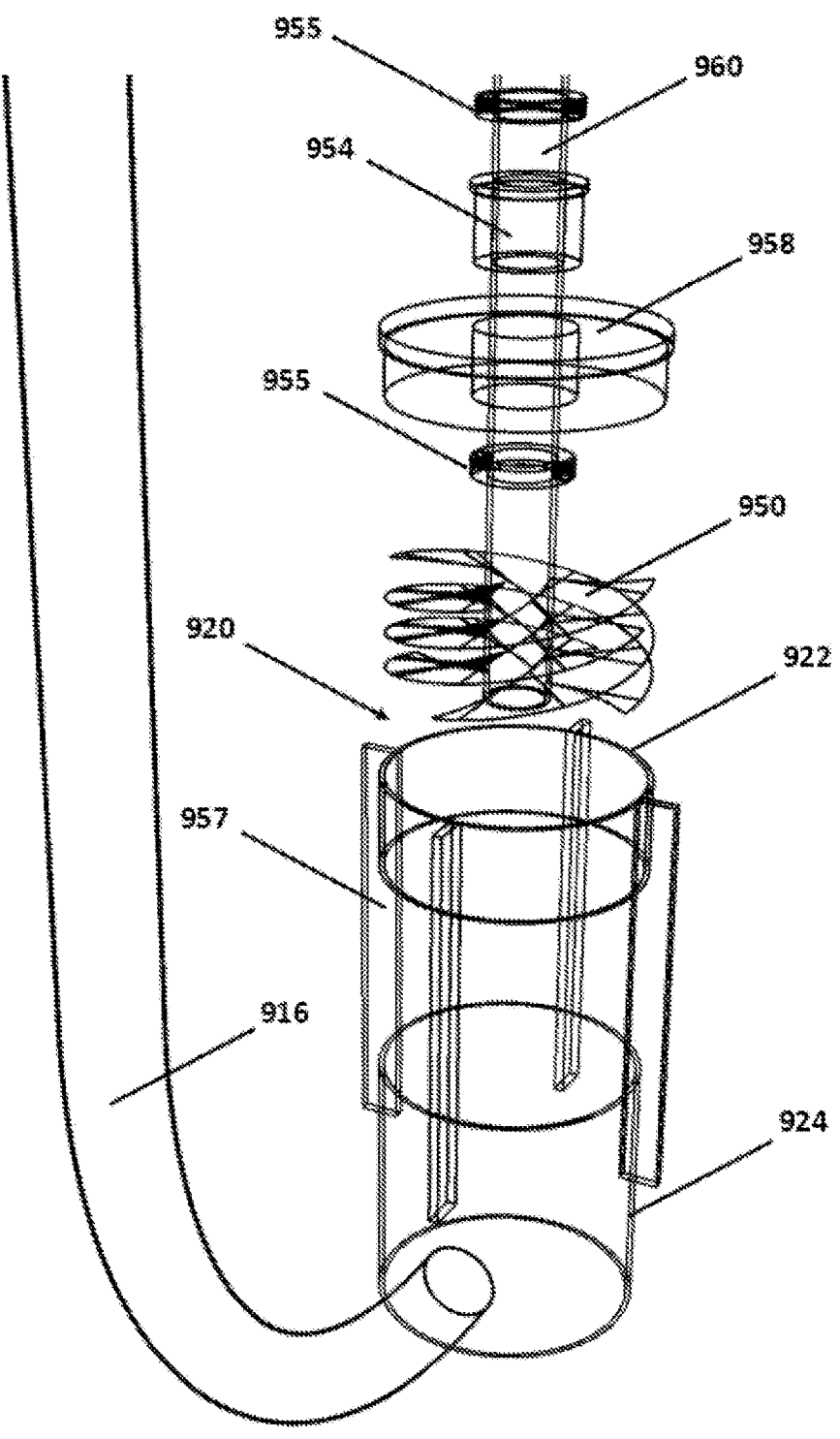
FIG. 10*d* shows an exploded view of the impellers of the storage tank of FIG. 10*b.
Figure 10E:
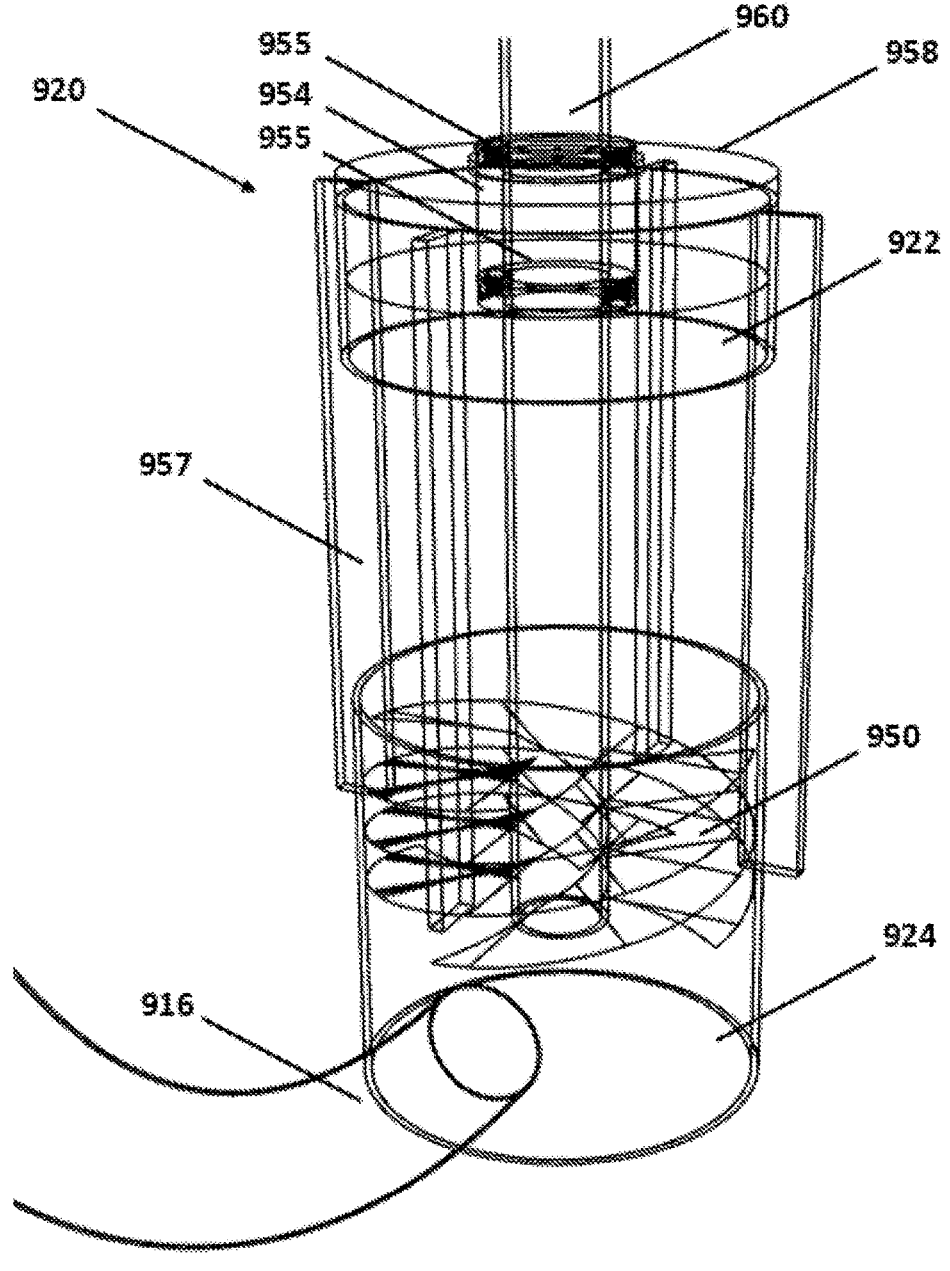
* and FIG. 10*e* shows a detailed view of an impeller of the storage tank of FIG. 10*b.*

FIGS. 10d and 10e show detailed exploded and un-exploded view of one of the impeller housings 920, the impeller 950 provided therein, and the end of the conduit 916 connecting thereto.

The impeller housing 920 comprises an upper cylindrical housing segment 922 a lower cylindrical housing segment 924, and four connecting rods 957 extending between the upper and lower housing segments 922, 924 defining open sides of the housing through which the working fluid may low into and out of the housing 920. A small flange (not shown) secures the lower housing 924 to the base of the storage tank 910.

The impeller 950 is located at an end of the impeller shaft 960 distal from the electric motor 940. In use, the impeller is located within the lower housing segment 924 of the impeller housing 920, as shown in FIG. 10e.

The end of the impeller shaft 960 is held in the centre of the lower housing segment 924 by an assembly comprising an impeller locating frame 958 that extends between opposing walls of the upper housing segment 922, two bearing retention clamps 955 hold the assembly vertically on the impeller shaft 960 supported in the centre of the housing 920, and a graphite bearing sleeve 954 that is supported within a central aperture of the impeller locating frame 958 and which surrounds the impeller shaft 960.

While certain arrangements have been described, they have been presented by way of example only, and are not intended to limit the scope of protection. The inventive concepts described herein may be implemented in a variety of other arrangements. In addition, various additions, omissions, substitutions and changes may be made to the arrangements described herein without departing from the scope of the invention as defined by the following claims.

The invention claimed is:

1. A solar collector comprising:

a conduit for a working fluid, and a parabolic trough reflector arranged to focus reflected sunlight onto the conduit; wherein the parabolic trough reflector is arranged to pivot around the conduit; wherein the conduit comprises:

an inner absorber tube for carrying the working fluid, and an outer transparent insulating tube surrounding the inner absorber tube, wherein the inner absorber tube and the outer transparent insulating tube are not fixed to each other; wherein the outer transparent insulating tube comprises a first outer transparent insulating tube wall, a second outer transparent insulating tube wall, and an at least partially evacuated space between the first outer transparent insulating tube wall and the second outer transparent insulating tube wall, wherein the solar collector further comprises:

at least one bearing between the conduit and the parabolic trough reflector which allows the parabolic trough reflector to pivot around the conduit, and at least one stand which supports the conduit and is connected to the parabolic trough reflector by the at least one bearing, wherein the at least one bearing is an annular bearing comprising a central aperture through which the conduit extends and within which the conduit is supported, and wherein the at least one bearing comprises an inner portion with the central aperture, and the inner portion is fixed to the at least one stand.

2. The solar collector according to claim 1, wherein the first outer transparent insulating tube wall and the second outer transparent insulating tube wall have substantially the same thermal expansion rates.

3. The solar collector according to claim 1, wherein the first outer transparent insulating tube wall and the second outer transparent insulating tube wall are formed of glass.

4. The solar collector according to claim 1, wherein the parabolic trough reflector is arranged to pivot around, with respect to, the conduit.

5. The solar collector according to claim 1, wherein the inner absorber tube and the outer transparent insulating tube have different thermal expansion rates.

6. The solar collector according to claim 1, further comprising one or more counterweights fixed to the parabolic trough reflector such that they are located on an opposite side of the conduit to the parabolic trough reflector and such that they are rotatable with the parabolic trough reflector around the conduit.

7. A solar collector system comprising one or more solar collectors according to claim 1 and a heat exchanger and a storage tank, wherein the storage tank, the heat exchanger and the conduits of each of the one or more solar collectors are connected to define a closed-loop fluid pathway for a working fluid.

8. The solar collector system according to claim 7, further comprising an impeller located inside the storage tank, a corresponding motor located outside the storage tank, a shaft extending from the impeller out of the storage tank towards the motor by which the motor is configured to rotate the impeller, and a thermal break provided between the shaft and the motor.

9. A solar collector system comprising one or more solar collectors according to claim 1, a heat exchanger and one or more piston tanks, each piston tank comprising a first portion for receiving steam from the heat exchanger, and a second portion for containing water, wherein the first and second portions are separated by a displaceable barrier, such that steam entering the first portion increases the hydrostatic pressure within the second portion.

10. The solar collector system according to claim 9, wherein the first and second portions are upper and lower portions respectively and the displaceable barrier is a floating barrier that floats upon the water within the lower portion of the piston tank.

11. The solar collector system according to claim 9, further comprising a water turbine configured to be driven by water being driven out of the one or more piston tanks under increased hydrostatic pressure.

12. The solar collector system according to claim 9, further comprising two or more piston tanks.

13. The solar collector system according to claim 12, further comprising a valve arrangement configured to direct steam from the heat exchanger alternately into the first portion of a first of the piston tanks and into the first portion of a second of the piston tanks.

* * * * *